US009659005B2

(12) United States Patent
Ramish

(10) Patent No.: US 9,659,005 B2
(45) Date of Patent: May 23, 2017

(54) SYSTEM FOR SEMANTIC INTERPRETATION

(71) Applicant: Semantix Technologies Corporation, Sparks, NV (US)

(72) Inventor: John Ramish, Sparks, NV (US)

(73) Assignee: Semantix Technologies Corporation, Gainesville, VA (US)

( * ) Notice: Subject to any disclaimer, the term of this patent is extended or adjusted under 35 U.S.C. 154(b) by 90 days.

(21) Appl. No.: 14/577,642

(22) Filed: Dec. 19, 2014

(65) Prior Publication Data
US 2015/0331850 A1 Nov. 19, 2015

Related U.S. Application Data

(60) Provisional application No. 61/994,238, filed on May 16, 2014.

(51) Int. Cl.
G06F 17/27 (2006.01)
G06F 17/28 (2006.01)
(Continued)

(52) U.S. Cl.
CPC ........ *G06F 17/2785* (2013.01); *G06F 17/271* (2013.01); *G06F 17/28* (2013.01);
(Continued)

(58) Field of Classification Search
CPC .. G06F 17/241; G06F 17/2264; G06F 17/227; G06F 17/2276; G06F 17/2282
See application file for complete search history.

(56) References Cited

U.S. PATENT DOCUMENTS 7,146,308 B2    12/2006  Lin et al.
7,536,634 B2 *   5/2009  Green ................ G06F 17/2264
                                                        715/200
(Continued)

OTHER PUBLICATIONS

Kwon, N., Fleischman, M. B, and Hovy, E., FrameNet-based semantic parsing using maximum entropy models, In Proceedings of COLING-04, Geneva, Switzerland, 2004.*

(Continued)

*Primary Examiner* — Richard Zhu
(74) *Attorney, Agent, or Firm* — Cooley LLP; Frank Pietrantonio

(57) ABSTRACT

A semantic database is generated to provide answers to questions by users. Text processors can receive text from text sources, and can convert the text into intermediate logical statements. The text processors can then convert these statements into unambiguous semantic representations. A semantic database connected to the text processors can store the semantic representations. Query processors connected to the semantic database can receive a question from a computing device operated by a user, and can convert the question into intermediate logical subqueries. The query processors can then use a disambiguation table to generate unambiguous semantic subqueries from these intermediate logical subqueries. Using the semantic database, the query processors can match each semantic subquery to the stored semantic representation, and join results of the matching as appropriate, to determine one or more answers to the question. The query processors can send the one or more answers to the computing device.

29 Claims, 12 Drawing Sheets

Overview of Interpretation of Source Text

(51) Int. Cl.
 G06F 17/30 (2006.01)
 G06F 17/22 (2006.01)
(52) U.S. Cl.
 CPC ...... *G06F 17/30424* (2013.01); *G06F 17/227* (2013.01); *G06F 17/2264* (2013.01); *G06F 17/27* (2013.01); *G06F 17/30731* (2013.01); *G06F 17/30734* (2013.01)

(56) References Cited

U.S. PATENT DOCUMENTS

| | | | |
|---|---|---|---|
| 7,912,705 | B2 | 3/2011 | Wasson et al. |
| 7,937,265 | B1 | 5/2011 | Pasca et al. |
| 8,001,144 | B2 | 8/2011 | Novak |
| 8,244,730 | B2 | 8/2012 | Gupta |
| 8,370,128 | B2 | 2/2013 | Brun et al. |
| 8,442,828 | B2 * | 5/2013 | Wang .................. G06F 17/2785 704/250 |
| 8,977,953 | B1 * | 3/2015 | Pierre .................. G06F 17/2785 715/201 |
| 2003/0182102 | A1 * | 9/2003 | Corston-Oliver ... G06F 17/2881 704/9 |
| 2016/0239739 | A1 * | 8/2016 | Das ....................... G06F 17/289 |

OTHER PUBLICATIONS

Baker, Collin F., Charles J. Fillmore, and John B. Lowe. 1998. The Berkeley FrameNet project. In Proceedings of COLING/ACL, pp. 86-90, Montreal, Canada.

Bar-Haim, Roy, et al. 2007. Semantic Inference at the Lexical-Syntactic Level. RTE '07 Proceedings of the ACL-PASCAL Workshop on Textual Entailment and Paraphrasing. pp. 131-136. Association for Computational Linguistics Stroudsburg, PA, USA.

Berant, Jonathan, et al. 2011. Global Learning of Typed Entailment Rules. Proceedings of the 49$^{th}$ Annual Meeting of the Association for Computational Linguistics, pp. 610-619, Portland, Oregon, Jun. 19-24, 2011.

Del Corro, Luciano and Germulla, Rainer. 2013. Clause IE: Clause-Based Open Information Extraction. WWW '13 Proceedings of the 22nd international conference on World Wide Web, pp. 355-366.

Fellbaum, Christiane, ed. 1998. Wordnet: An Electronic Lexical Database. *MIT Press*.

Fillmore, Charles J. and Baker, Collin. 2009. A Frames Approach to Semantic Analysis. The Oxford Handbook of Linguistic Analysis, Chapter 13.

Gamallo, Pablo and Garcia, Marcos. 2012. Dependency-Based Open Information Extraction. Proceedings of the 13$^{th}$ Conference of the European Chapter of the Association for Computational Linguistics, pp. 10-18, Avignon, France. Apr. 23-27, 2012.

Gildea, Daniel and Daniel Jurafsky. 2002. Automatic labeling of semantic roles. *Computational Linguistics*, 28(3):245-288.

Kwiatkowski, Tom, et al. 2013. Scaling Semantic Parsers with On-the-Fly Ontology Matching. Proceedings of the 2013 Conference on Empirical Methods in Natural Language Processing. pp. 1545-1556.

Lin, Dekang and Patrick Pantel. 2001. DIRT—Discovery of Inference Rules from Text. In *Proceedings of ACM SIGKDD Conference on Knowledge Discovery and Data Mining*, pp. 323-328, San Francisco, CA.

Mausam, Michael, et al. 2012. Open language learning for information extraction. EMNLP-CoNLL '12 Proceedings of the 2012 Joint Conference on Empirical Methods in Natural Language Processing and Computational Natural Language Learning. pp. 523-534.

Min, Bonan et al., 2012. Toward Large-Scale Unsupervised Relation Extraction from the Web. International Journal on Semantic Web and Information Systems. vol. 8, Issue: 3.

Nakashole, Ndapandula, et al. 2012. PATTY: a taxonomy of relational patterns with semantic types. EMNLP-CoNLL '12 Proceedings of the 2012 Joint Conference on Empirical Methods in Natural Language Processing and Computational Natural Language Learning. pp. 1135-1145.

Palmer, Martha, Dan Gildea, Paul Kingsbury. 2005. The Proposition Bank: A Corpus Annotated with Semantic Roles. *Computational Linguistics Journal*, 31(1).

Pantel, Patrick, Rahul Bhagat, Bonaventura Coppola, Timothy Chklovski, and Eduard Hovy. 2007. ISP: Learning Inferential Selectional Preferences. In *Proceedings of NAACL HLT*.

Pasca, Marius and Peter Dienes. 2005. Aligning needles in a haystack: Paraphrase acquisition across the Web. In *Proceedings of IJCNLP*, pp. 119-130, Jeju Island.

Romano, Lorenza, et al. 2006. Investigating a Generic Paraphrase-based Approach for Relation Extraction. 11th Conference of the European Chapter of the Association for Computational Linguistics.

Ruppenhofer, Josef, Michael Ellsworth, Miriam R. L. Petruck, Christopher R. Johnson, and Jan Scheffczyk. 2010. FrameNet II: Extended Theory and Practice. <http://framenet2.icsi.berkeley.edu/docs/r1.5/book.pdf>.

Schuler, Karin K. 2005. VerbNet: A broad-coverage, comprehensive verb lexicon.

Sekine, Satoshi. 2005. Automatic paraphrase discovery based on context and keywords between NE pairs. In *Proceedings of the International Workshop on Paraphrasing*, pp. 80-87, Jeju Island, South Korea.

Stanovsky, Gabriel, et al. 2014. Intermediary Semantic Representation through Proposition Structures. Proceedings of the ACL 2014 Workshop on Semantic Parsing, pp. 66-70, Baltimore, Maryland, Jun. 26, 2014.

Yao, Limin, et al. 2011. Structured Relation Discovery Using Generative Models. EMNLP '11 Proceedings of the Conference on Empirical Methods in Natural Language Processing. pp. 1456-1466.

Yao, Limin, Sebastian Riedel, and Andrew McCallum. 2012. Unsupervised relation discovery with sense disambiguation. *Proceedings of the 50th Annual Meeting of the Association for Computational Linguistics: Long Papers-vol. 1*. Association for Computational Linguistics.

Yates, Alexander and Etzioni, Oren. 2009. Unsupervised Methods for Determining Object and Relation Synonyms on the Web. Journal of Artificial Intelligence Research 34: 255-296.

* cited by examiner

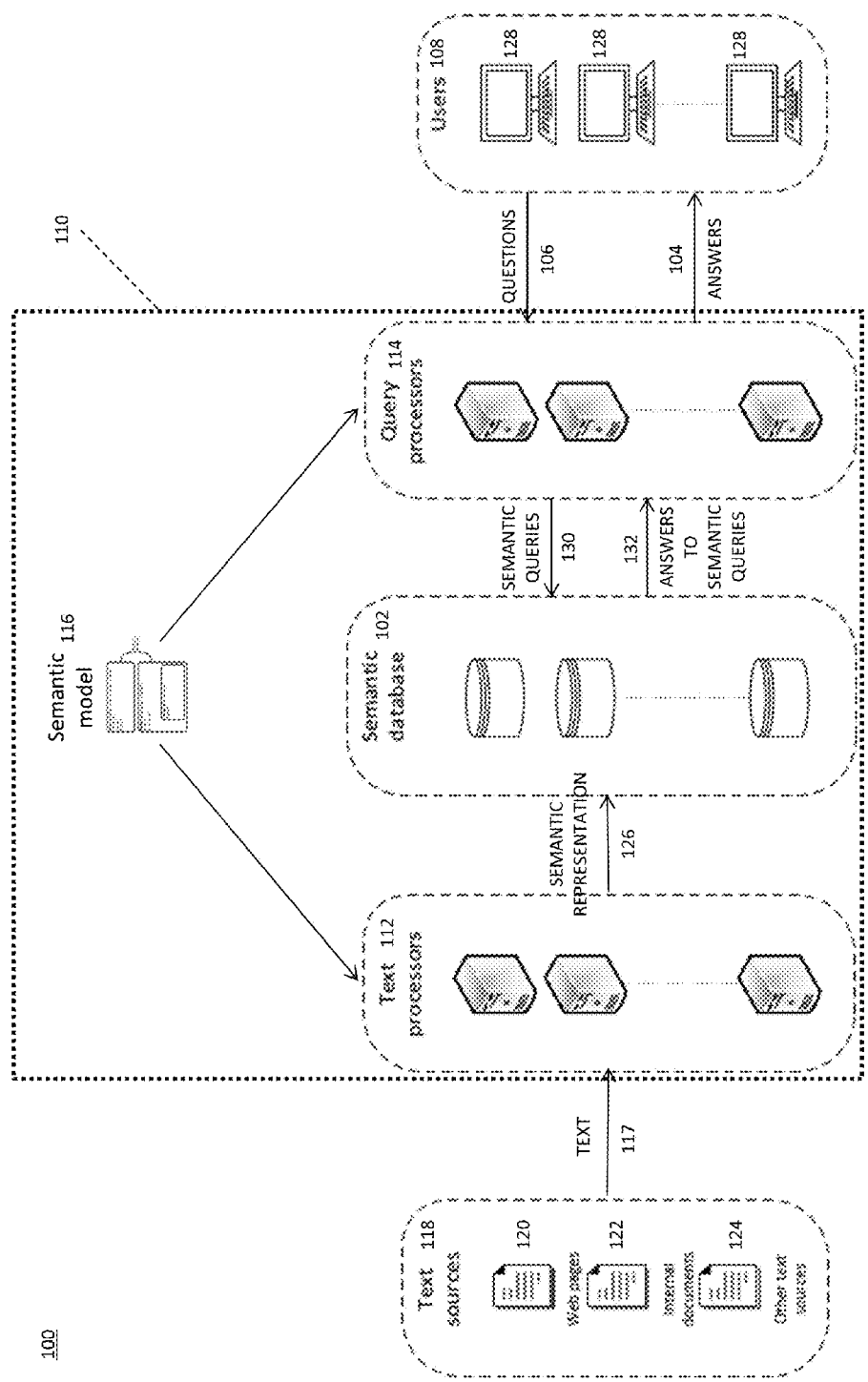
FIG. 1: System Diagram

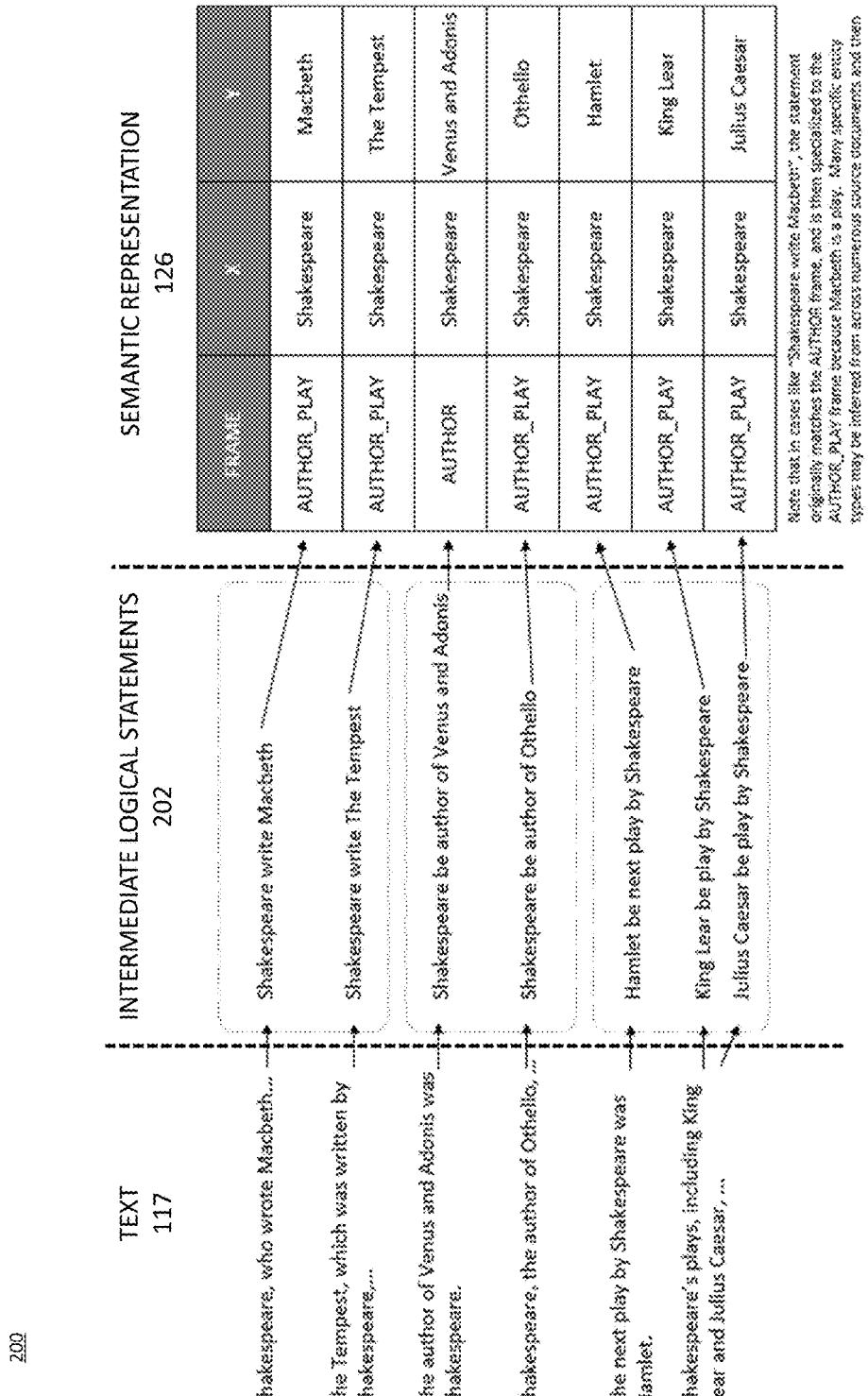
FIG. 2: Overview of Interpretation of Source Text

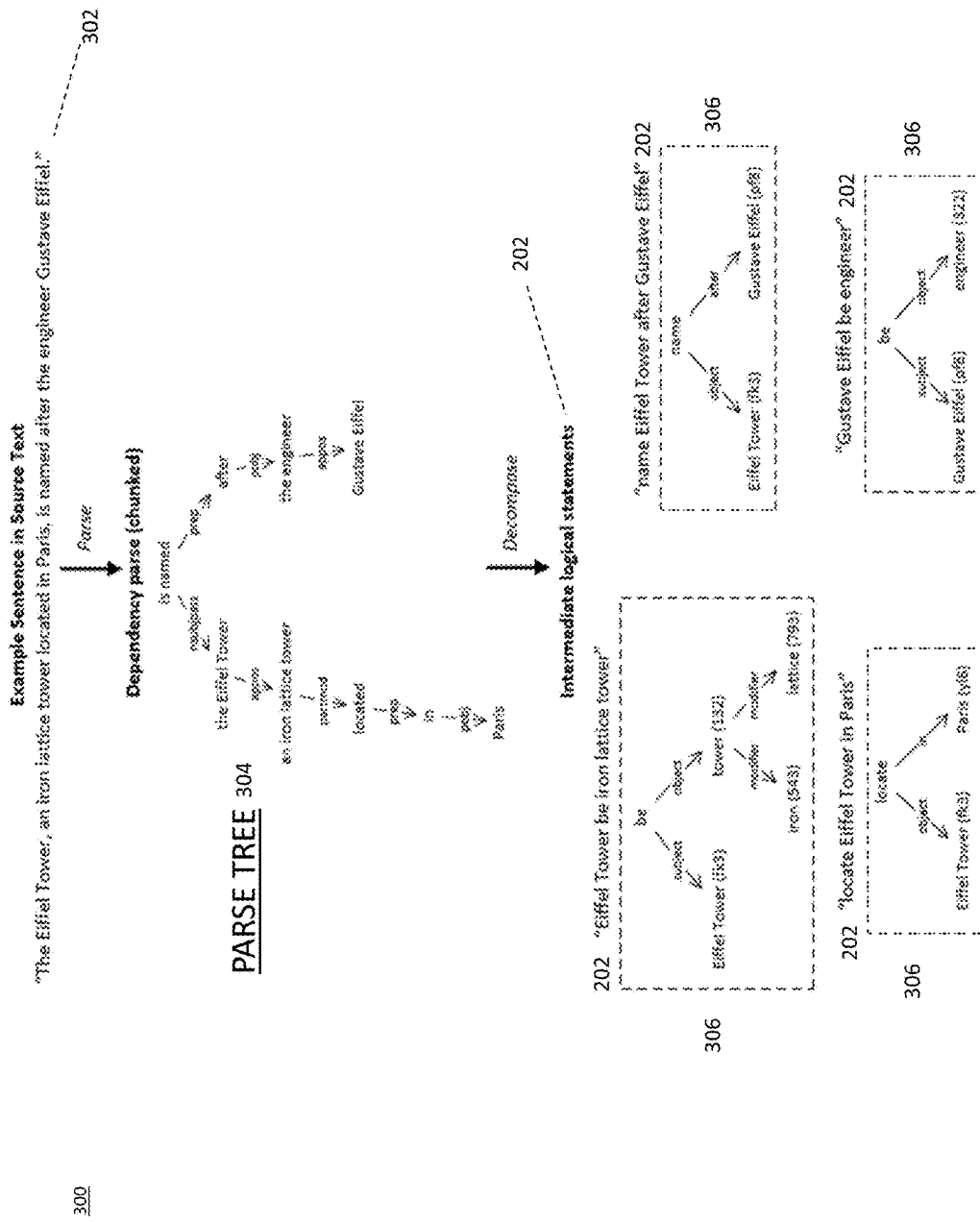
FIG. 3: Example of Conversion of Text to Intermediate Logical Statement(s)

FIG. 4: Conversion of Text to Intermediate Logical Statement(s)

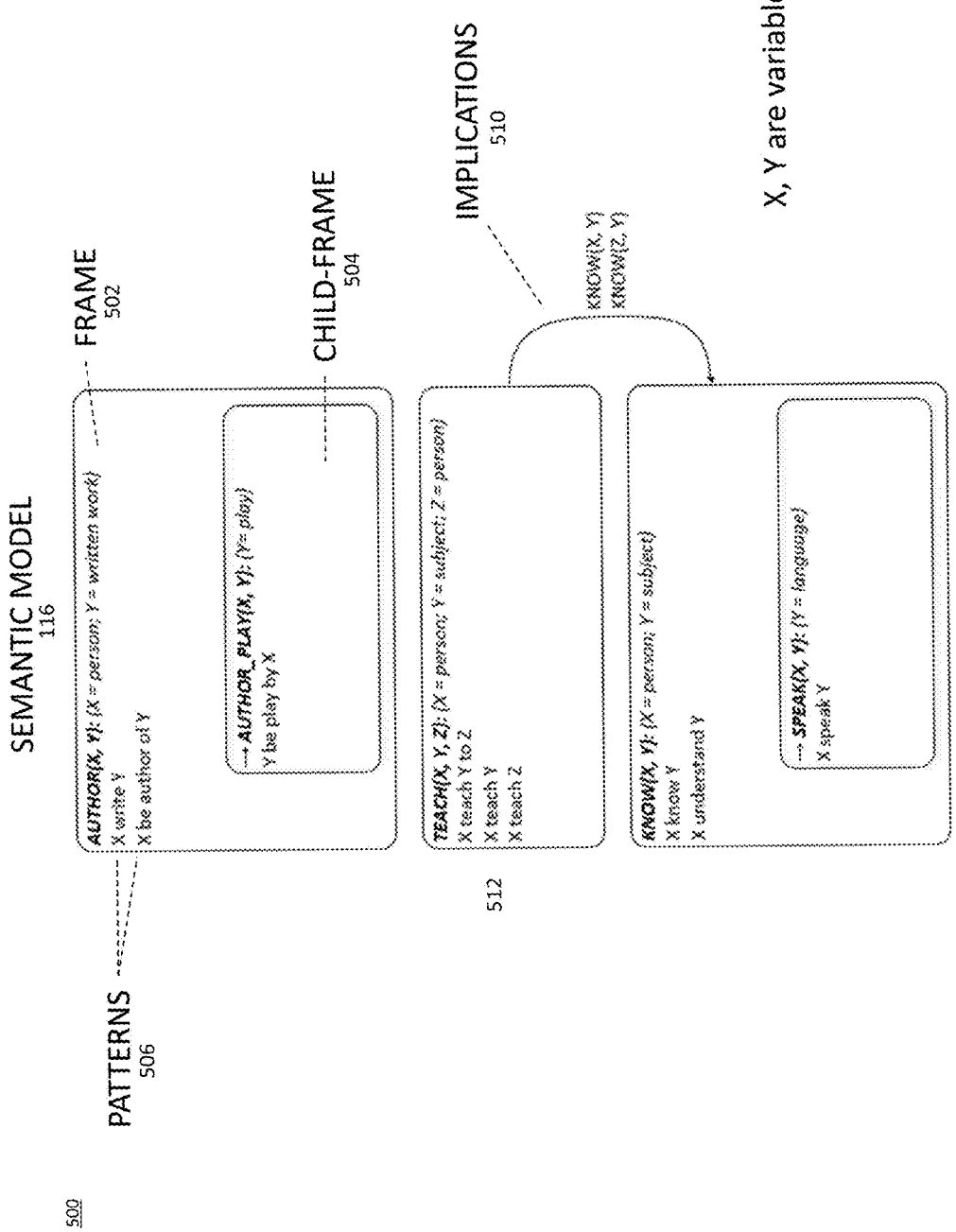
FIG. 5: Example of Semantic Model

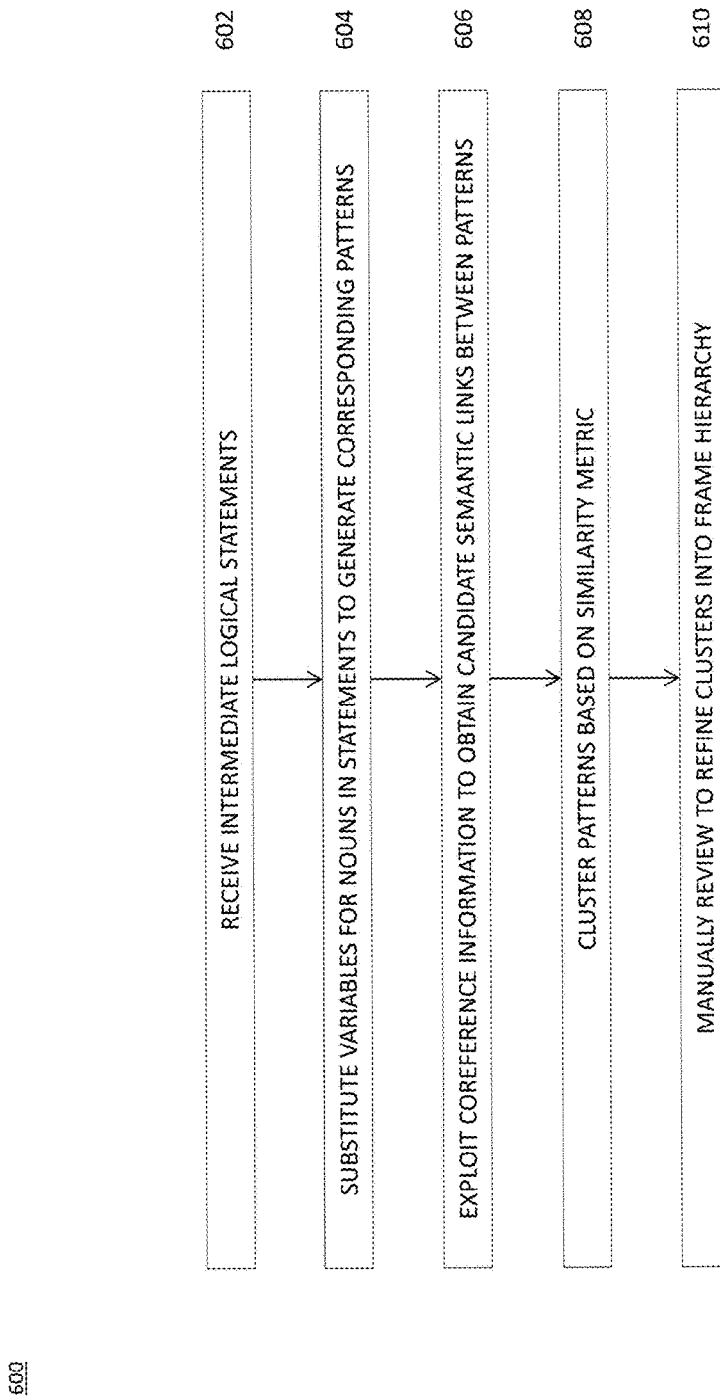
FIG. 6: Generation of a Semantic Model

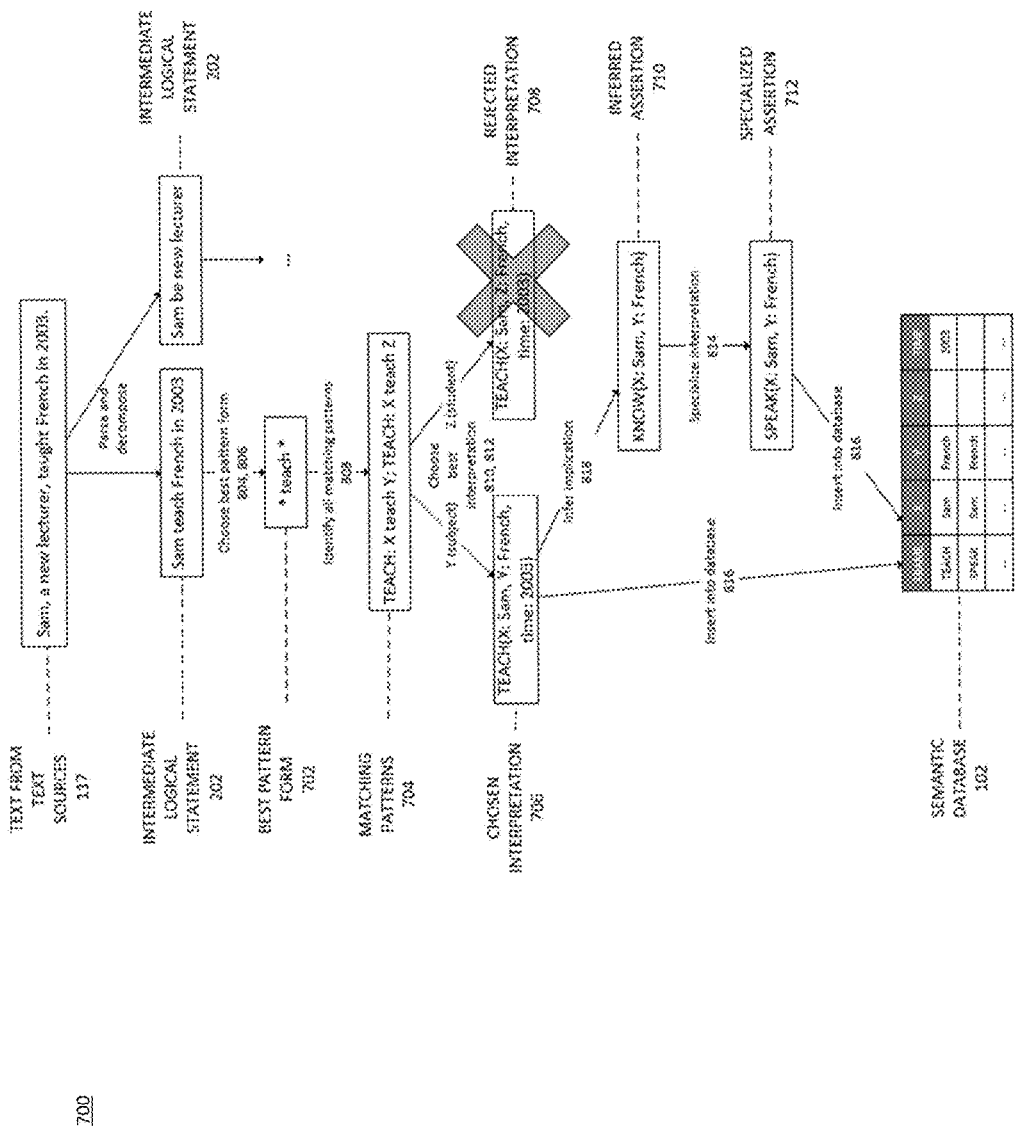
FIG. 7: Example of Conversion of Intermediate Logical Statements to Semantic Representation

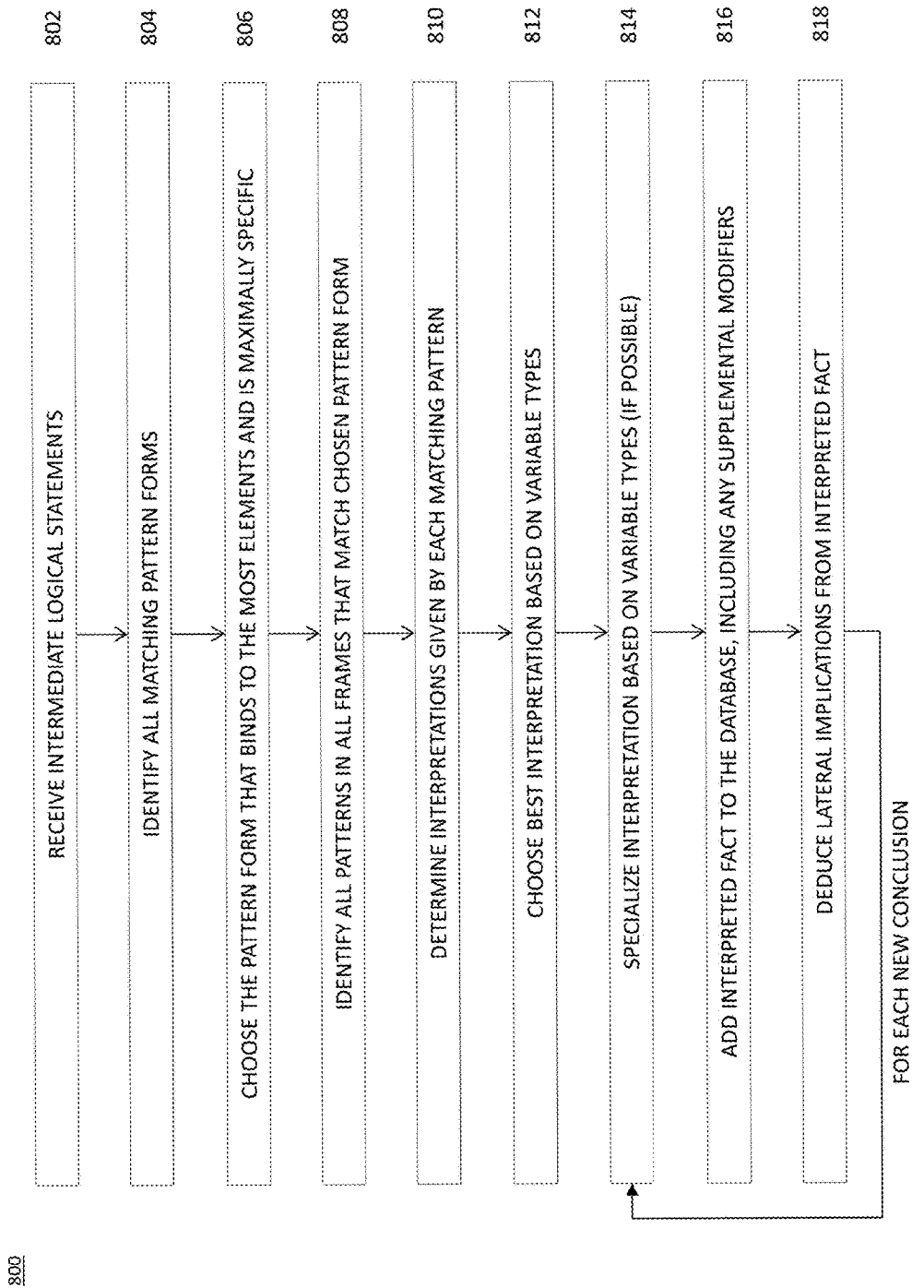
FIG. 8: Conversion of Intermediate Logical Statements to Semantic Representation

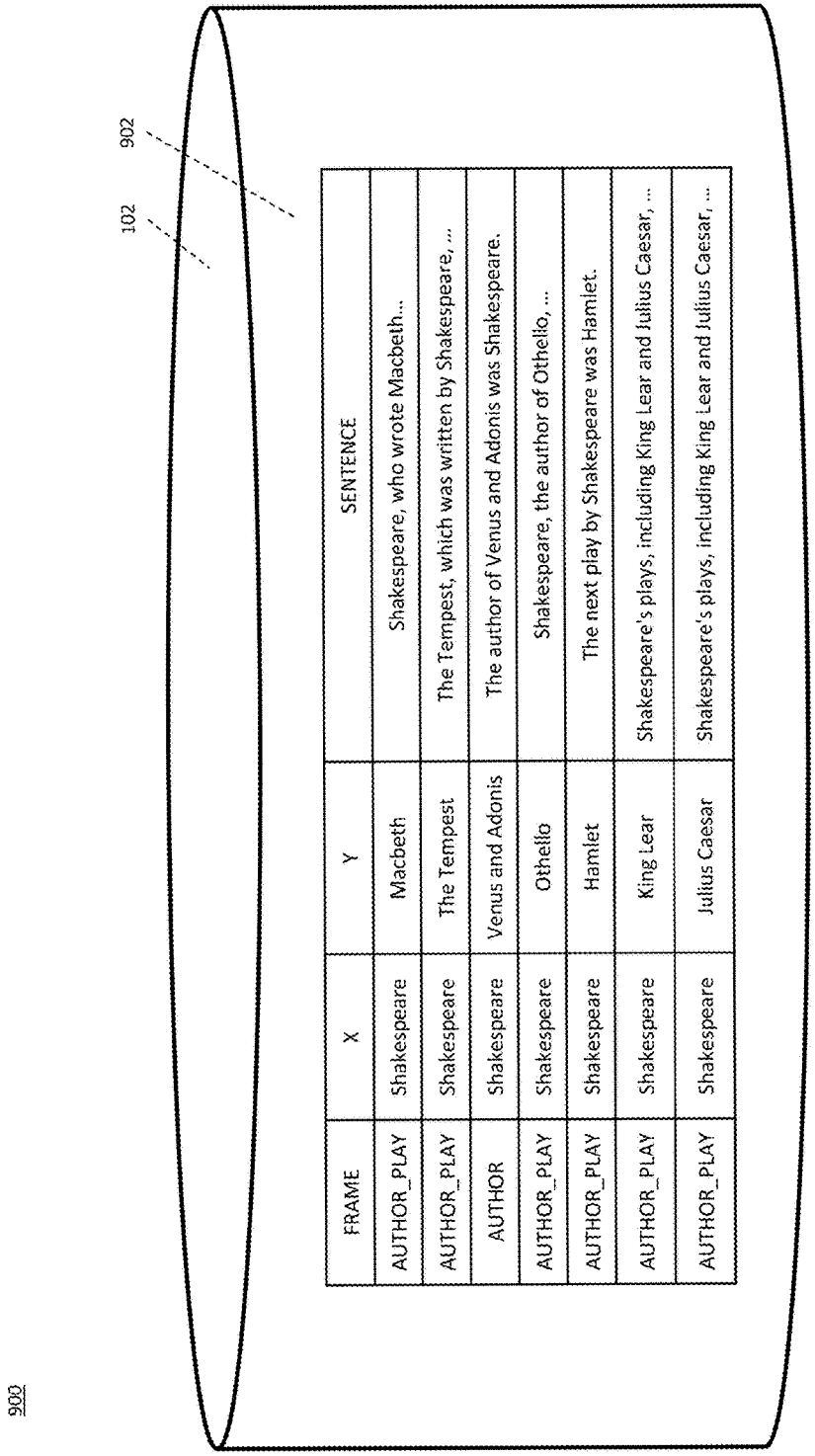
FIG. 9: Semantic Database

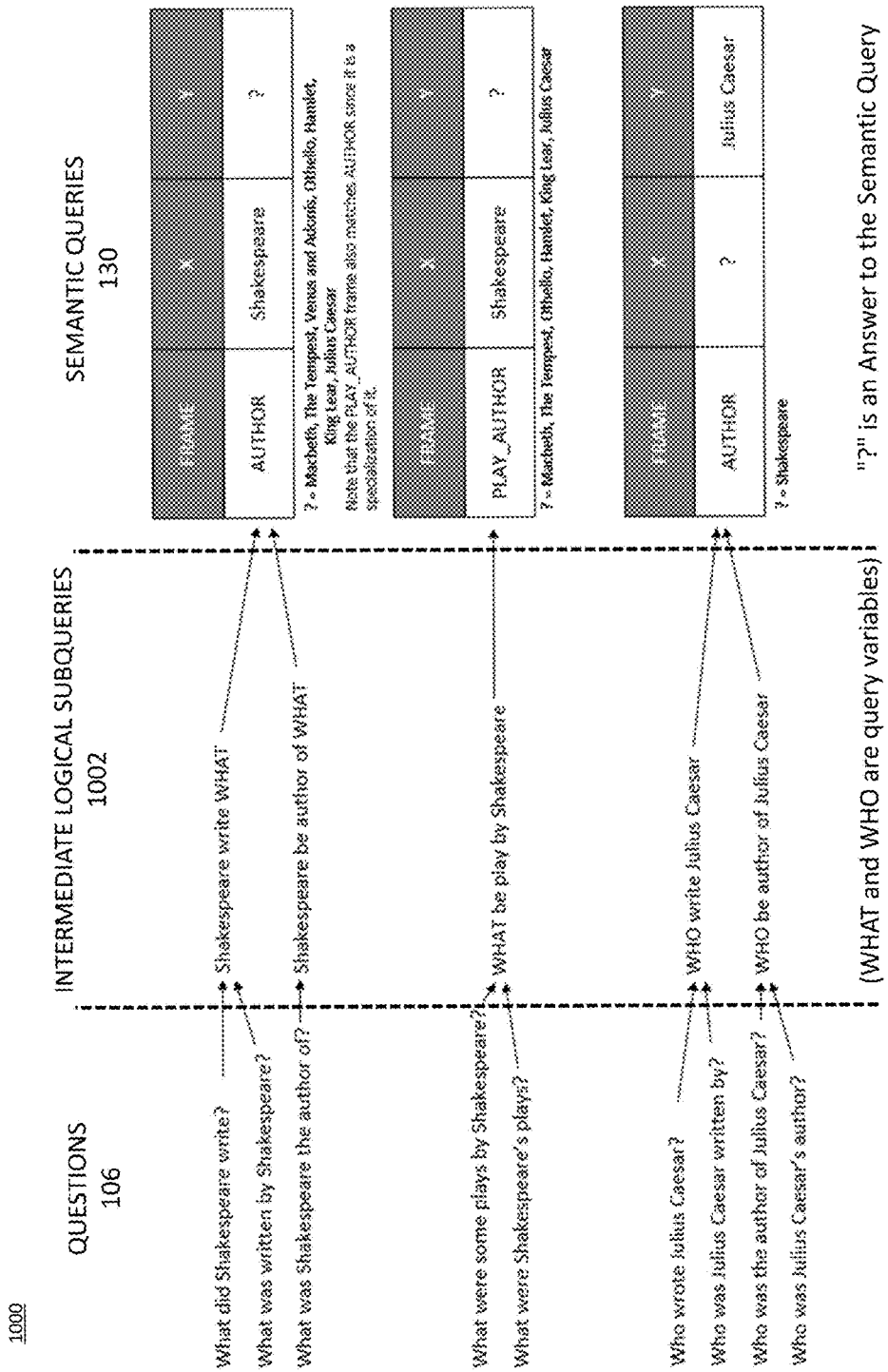
FIG. 10: Overview of Generation of Semantic Queries

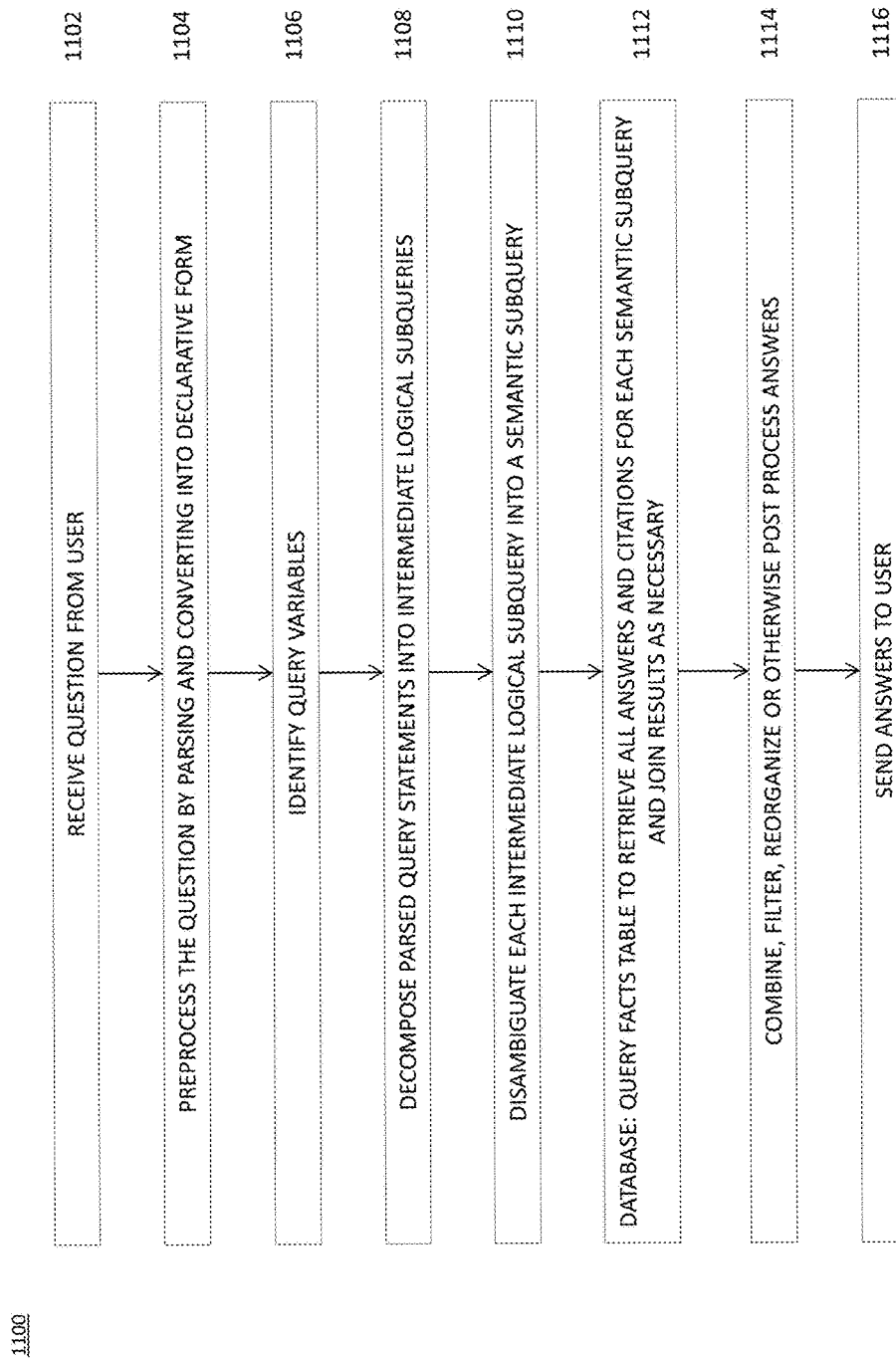
FIG. 11: Determination of Answer(s) to a Question

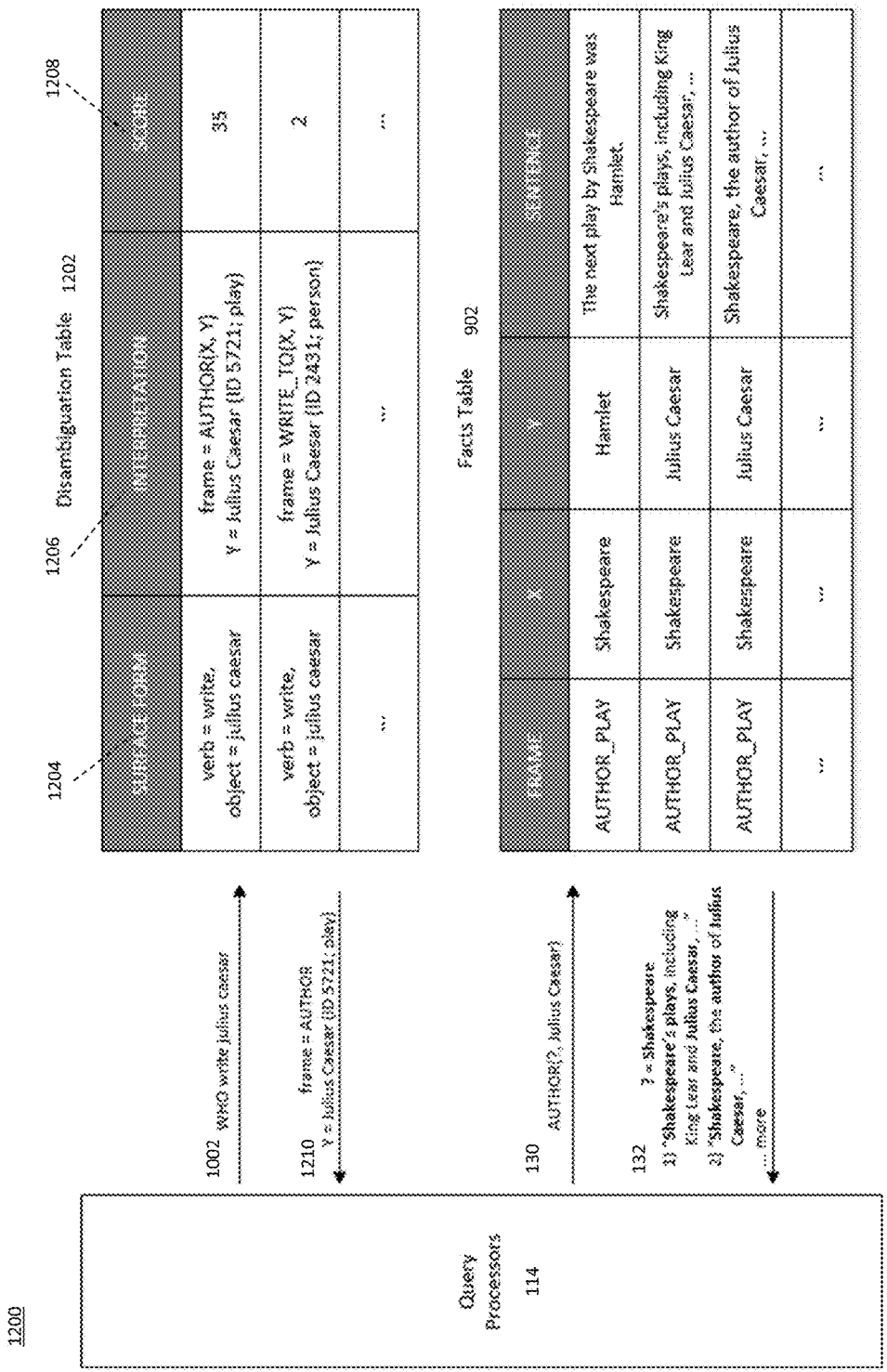
FIG. 12: Disambiguation of Intermediate Logical Subquery

SYSTEM FOR SEMANTIC INTERPRETATION

RELATED APPLICATION

This patent application claims priority to U.S. Provisional Patent Application Ser. No. 61/994,238, filed May 16, 2014, and entitled "Information Extraction Using a Semantic Database," the contents of which are incorporated herein by reference in entirety.

TECHNICAL FIELD

The subject matter described herein relates to information extraction and question answering. Specifically, the current subject matter describes automatic generation of a database of the semantic content of source text, and using this database for question answering and other applications.

BACKGROUND

The field of information extraction aims to extract the information content (usually in the form of entities, relations, and events) from natural language text into a database, which provides a more useful representation than the raw text. Many traditional approaches use either rules or supervised classifiers trained on labeled examples. Both of these approaches are generally used to extract a handful of pre-determined relations or events, and face challenges when attempting to build systems extracting many hundreds or thousands of types of relations and events. Open information extraction systems can extract large numbers of relations, but the resulting extractions are often not standardized; as a result, paraphrases of the same information are often represented in different ways.

Many question answering systems are based on information retrieval instead of information extraction. Instead of directly querying a database for answers, they search text for candidate answer passages and rank them according to various criteria. This approach requires much more processing at query time than a simple database lookup, and faces complications when numerous answers or pieces of information are required, rather than a single answer. Because this approach lacks an explicit representation of knowledge, it also does not easily support many of the other capabilities of a database: the knowledge cannot easily be browsed or explored or combined or analyzed or reasoned about or transferred.

SUMMARY

The current subject matter describes generating a semantic database that can be used, among other applications, to provide answers to questions by users. Text processors can receive text from text sources, and can parse the text and convert it into intermediate logical statements that abstract over grammatical variations. Using a semantic model, the text processors can then convert these statements into an unambiguous representation of their meaning. This semantic representation, which abstracts over paraphrases, is then stored in the semantic database. The database may be used in many ways, including various forms of analysis and answering questions from users. In order to answer questions, query processors can receive a question from a computing device operated by a user, and can convert the question into intermediate logical subqueries. The query processors can then convert these subqueries into unambiguous semantic subqueries, using the semantic model with the aid of disambiguation information in the database. The database can then match these semantic subqueries to the stored semantic representations, and possibly join the results of these subqueries, in order to determine answers to the question. The query processors can send the answers to the computing device that can subsequently output the answers. Related apparatuses, systems, techniques and articles are also described.

In one aspect, one or more text processors can receive text from one or more text sources. The one or more text processors can convert the text into a plurality of intermediate logical statements that abstract over the syntactic form of information in the text. The one or more text processors can convert each intermediate logical statement into a semantic representation that equates intermediate logical statements having equivalent meanings. The semantic representation can express facts that characterize at least one of relations and events. The one or more text processors can send the semantic representation to a semantic database configured to store the semantic representation.

In some variations, one or more of the following can implemented either individually or in any feasible combination. The semantic database can used to determine one or more answers to a question by a user. The text can include a plurality of sentences. The one or more text sources can include at least one of: web pages and internal documents. Each intermediate logical statement can correspond to a tree having a root node, one or more other nodes, and one or more edges. The root node can represent a verb in the intermediate logical statement. The one or more other nodes can represent at least one of a logical subject, a logical object, prepositional objects, and other modifiers in the intermediate logical statement. The one or more edges can identify relationships among the root and the one or more other nodes.

The one or more text processors use a semantic model to convert each intermediate logical statement into the semantic representation, such that: the semantic model comprises a plurality of frames, each frame representing a relation or event; each frame comprises one or more variables serving roles in the relation or event; and each frame comprises one or more equivalent patterns, each pattern having a form of an intermediate logical statement including at least one variable and possibly constants. Each frame can include constraints on types of the variables. The plurality of frames can be hierarchically organized as at least one child frame and at least one parent frame. The at least one child frame can express a meaning that is narrower than a meaning of the at least one parent frame. The at least one child frame can logically imply the at least one parent frame. The at least one child frame can permit specialization that allows facts in the at least one parent frame to be narrowed in meaning so as to belong to the at least one child frame. At least one frame can be related to at least one other frame with a lateral implication such that facts in the at least one other frame are inferred non-hierarchically from facts in the at least one frame.

The semantic model can be generated using at least one processor. The generation of the semantic model can include: receiving one or more intermediate logical statements that abstract over the syntactic form of the information in the text; substituting variables for nouns in the one or more intermediate logical statements to generate corresponding patterns; exploiting coreference information about nouns to obtain candidate semantic links between the corresponding patterns; clustering the linked patterns based on a similarity metric; and generating, based on a review of the clustered patterns, a frame hierarchy comprising a plurality of frames forming the semantic model. The at least one processor can be the one or more text processors.

The converting of the text into the intermediate logical statements of the text by the one or more text processors can include one or more of: parsing the text into a parse tree; extracting and labeling named entities; resolving entity mentions within and across documents for coreference; disambiguating word senses, so as to assign sense identifiers to words; replacing relative pronouns in the parse tree with corresponding referents; replacing entity mentions including pronouns and definite nominals in the parse tree with canonical mentions; identifying intermediate logical statements from at least one of verbs, verbals, appositives, event nouns, possessives, and special constructs in the parse tree; identifying for each intermediate logical statement the corresponding logical subjects, logical objects, prepositional phrases, and other modifiers from the parse tree; converting possessives from the parse tree into prepositional forms; converting indirect objects from the parse tree into prepositional forms; distributing over conjunctions in the parse tree; and substituting variables for subordinate clauses in the parse tree.

The conversion of each intermediate logical statement into the semantic representation by the one or more text processors can include: receiving the intermediate logical statement; identifying candidate interpretations associated with the intermediate logical statement, a candidate interpretation being characterized by a frame, bindings for some or all variables of the frame, and possibly supplemental modifiers; and selecting, from the candidate interpretations, a best interpretation based on at least one of variable type compatibility and likelihood, the best interpretation characterizing the semantic representation. The conversion of each intermediate logical statement into the semantic representation by the one or more text processors can further include: specializing the selected interpretation to a narrower meaning as applicable based on at least one of variable type compatibility and likelihood; deducing any applicable lateral implications from the specialized interpretation; and recursively specializing and deducing lateral implications for each new fact concluded from a lateral implication in order to generate the semantic representation. Identifying the candidate interpretations by the one or more text processors can include: identifying matching pattern forms, a pattern form of the matching pattern forms being a pattern with wildcard characters in place of variables to indicate that the variables are undistinguished; selecting, from the identified pattern forms, a pattern form that binds to the most elements of the intermediate logical statement and is maximally specific to the intermediate logical statement; identifying patterns in frames that match the selected pattern form; and determining interpretations given by each matching pattern, the determined interpretations being the candidate interpretations.

The one or more text processors and the semantic database can be connected via a communication network.

In another aspect, one or more query processors can receive a question from a computing device. The one or more query processors can convert the question into one or more intermediate logical subqueries that abstract over the syntactic form of the question. The one or more query processors can convert each intermediate logical subquery into a semantic subquery in a representation that equates intermediate logical subqueries having equivalent meanings. The one or more query processors can send the semantic query to the database. The semantic query can be one or more semantic subqueries joined together. The one or more database processors can retrieve facts from the database that match the semantic subqueries. The one or more database processors can join the facts when necessary to generate one or more answers to the question. The one or more database processors can return the joined facts to the one or more query processors. The one or more query processors can send the one or more answers to the computing device.

In some variations, one or more of the following can be implemented either individually or in any feasible combination. The one or more answers can be combined, filtered, and reorganized before sending the one or more answers to the computing device. The computing device can execute a graphical user interface that displays the one or more answers to the question. Each intermediate logical subquery can correspond to a tree having a root node, one or more other nodes, and one or more edges. The root node can represent a verb in the intermediate logical subquery. The one or more other nodes can represent at least one of a logical subject, a logical object, prepositional objects, and other modifiers in the intermediate logical subquery. The one or more edges can identify relationships among the root and the one or more other nodes.

The conversion of the question into the intermediate logical subqueries by the one or more query processors can include one or more of: parsing the question into a parse tree; converting the parse tree into a declarative form; identifying explicit and implicit query variables in the parse tree; replacing relative pronouns in the parse tree with corresponding referents; replacing entity mentions including pronouns and definite nominals in the parse tree statements with canonical mentions; identifying intermediate logical subqueries from at least one of verbs, verbals, appositives, event nouns, possessives, and special constructs in the parse tree; identifying, for each intermediate logical subquery, corresponding logical subjects, logical objects, prepositional phrases, and other modifiers from the parse tree; converting possessives from the parse tree into prepositional forms; converting indirect objects from the parse tree into prepositional forms; distributing over conjunctions in the parse tree; and substituting variables for subordinate clauses in the parse tree.

The conversion of the intermediate logical subquery into the semantic subquery by the one or more query processors can include: identifying a surface form that corresponds to the intermediate logical subquery; retrieving interpretations for the surface form from a disambiguation table in the database; and selecting, from the retrieved interpretations, a highest-scoring interpretation that is compatible with query variables of the intermediate logical subquery, the highest-scoring interpretation characterizing the semantic subquery. The disambiguation table can be generated by: identifying patterns for each semantic frame, aliases for each entity, and words for each noun or adjective sense as surface forms; generating surface forms for each interpreted semantic fact by combining the surface forms for the semantic frame of the fact with the surface forms of one or more frame elements; and assigning scores to interpretations for each surface form.

The scores for interpretations can be computed as frequencies of the interpretations. In another implementation, the scores can be proportional to P(surface_form|interpretation)*P(interpretation), wherein the scores can be computed as frequencies of the interpretations weighted by the probability of generating the surface form given the interpretation. The one or more query processors and the semantic database can be connected via a communication network.

In a yet another aspect, a system is described that can include one or more text processors, a semantic database, and one or more query processors. The one or more text processors can receive text from one or more text sources. The one or more text processors can convert the text into intermediate logical statements that abstract over syntactic form. The one or more text processors can convert each intermediate logical statement into a semantic representation that equates intermediate logical statements having equivalent meanings. The semantic database can be connected to the one or more text processors. The semantic database can receive the semantic representation from the one or more text processors. The semantic database can store the semantic representation. The one or more query processors can be connected to the semantic database. The one or more query processors can receive a question from a computing device. The one or more query processors can convert the question into one or more intermediate logical subqueries that abstract over syntactic form. The one or more query processors can convert each intermediate logical subquery into a semantic subquery in a representation that equates intermediate logical subqueries having equivalent meanings. The semantic database can match each semantic subquery to the stored semantic representations and join results as appropriate to determine one or more answers to the question. The one or more query processors can send the one or more answers to the computing device that outputs the one or more answers.

In some variations, one or more of the following can be implemented either individually or in any feasible combination. The one or more text processors can use a semantic model to convert the text into the semantic representation. The one or more query processors can use the semantic model to convert the question to the semantic query. The one or more text processors and the semantic database can be connected via a first communication network. The one or more query processors and the semantic database can be connected via a second communication network. In one implementation, the first communication network can be same as the second communication network. In another implementation, the first communication network can be different from the second communication network.

In another aspect, a computer-implemented method is described. A semantic database can receive a question from a computing device via a communication network. The semantic database can identify one or more answers responsive to the question. The semantic database can transmit the one or more answers to the computing device. The semantic database can be generated by: receiving text from one or more text sources; converting the text into intermediate logical statements that abstract over syntactic form; converting the intermediate logical statements into a semantic representation that equates intermediate logical statements having equivalent meanings; and storing the semantic representation. The stored semantic representations can form the semantic database.

Computer program products are also described that comprise non-transitory computer readable media storing instructions, which when executed by at least one data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. Unlike question answering systems based on information retrieval, this system explicitly stores its knowledge in a database, which greatly reduces the amount of processing required to answer queries and enables the numerous additional benefits of a database. Unlike traditional approaches to information extraction, this system can easily scale to thousands of types of relations and events. Unlike most open information extraction systems, this system can standardize its knowledge, equating paraphrases and inferring logical conclusions.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 1 is a system diagram illustrating the generation of a semantic database that can be used to provide answers to questions by users;

FIG. 2 is a diagram illustrating an overview of the conversion from text into intermediate logical statements and then into semantic representations by text processors;

FIG. 3 is a diagram illustrating an example of a conversion of text to intermediate logical statements by text processors;

FIG. 4 is a flow-diagram illustrating the generation of intermediate logical statements from text by text processors;

FIG. 5 is a diagram illustrating one simplistic example of a semantic model that includes frames, child frames, and patterns associated with these frames;

FIG. 6 is a flow-diagram illustrating a generation of a semantic model;

FIG. 7 is a diagram illustrating an example of the conversion of an intermediate logical statement into a semantic representation by text processors;

FIG. 8 is a flow-diagram illustrating the process of converting intermediate logical statements into semantic representations by text processors;

FIG. 9 is a diagram illustrating a semantic database including a table storing a semantic representation of facts (relations and events);

FIG. 10 is a diagram illustrating an overview of the generation of semantic queries by query processors; and FIG. 11 is a flow-diagram illustrating a determination of answers to a question by query processors.

FIG. 12 is a diagram illustrating an example of disambiguation of an intermediate logical subquery.

Like reference symbols in the various drawings indicate like elements.

DETAILED DESCRIPTION

System Overview

FIG. 1 is a system diagram 100 illustrating the generation of a semantic database 102 that can be used to provide answers 104 to questions 106 by users 108. A distributed computing system 110 can include text processors 112, the semantic database 102, query processors 114, and a semantic model 116. In some implementations, the text processors 112 are hardware processors. In some implementations, the query processors 114 are hardware processors.

The text processors 112 can receive text 117 from text sources 118, which can include web pages 120, internal documents 122 (for example, documents owned by a specific entity, such as an organization), and/or other text sources 124. The text processors 112 can generate a semantic representation (also referred to as a semantic interpretation) 126 of text 117 (as discussed in more detail below by diagram 200). To generate semantic representation 126 from text 117, the text processors 112 can first generate intermediate logical statements from the text 117 (as discussed in more detail below by diagrams 200, 300, and 400), and can subsequently generate the semantic representation 126 from the intermediate logical statements (as discussed in more detail below by diagrams 700 and 800). The text processors 112 can use the semantic model 116 (a simplistic example of which is shown in diagram 500, and generation of which is described by diagram 600) to generate the semantic representation 126 from the intermediate logical statements. The text processors 112 can send the semantic representation 126 of text to the semantic database 102, which can store a table 902 including the semantic representation 126 (as discussed below by diagram 900).

The query processors 114 can receive questions 106 from computing devices 128 that can be operated by users 108. Users 108 may include at least one of client applications and human users. The query processors 114 can generate semantic queries 130 from the questions 106 (as discussed in more detail below by diagram 1000). The query processors 114 can query the semantic database 102 in order to retrieve answers 132 to semantic queries (as discussed in more detail below by diagram 1100). The query processors 114 can use the semantic model 116 for retrieving the answers 132 to semantic queries 130. The query processors 114 can send answers 104 to the computing devices 128. The answers 104 can be a combined or reorganized product of the answers 132. Along with the answers 104, the query processors 114 may also send at least one citation (for example, a supporting sentence from a source document and a link to the document) for each answer 104. The computing devices 128 can output (for example, display on a graphical user interface) the answers 104 along with the citations to the users 108.

The semantic database 102 can store data in a tabular format. The semantic database 102 can be a hierarchical database. The semantic database 102 can be a distributed database. The semantic database 102 can be either a columnar database or a row based database. In one implementation, the semantic database 102 can be an in-memory database. The text processors 112 can include microprocessors or microcontrollers, and can further include memory devices that can store data associated with text processors 112. The query processors 114 can also include microprocessors or microcontrollers, and can further include memory devices that can store data associated with query processors 114.

The distributed computing system 110 can be connected to the text sources 118 via a first communication network. In an alternate implementation, the text sources 118 can be a part of the distributed computing system 110. The distributed computing system 110 can be connected to the computing devices 108 via a second communication network. In an alternate implementation, the computing devices 108 can be a part of the distributed computing system 110. In one implementation, the text processors 112 can be connected to the semantic database 102 via a third communication network, and the query processors 114 can be connected to the semantic database 102 via a fourth communication network. In an alternate implementation, two or more of the text processors 112, the query processors 114, and the semantic database 102 can be a part of a single machine that is packaged or machined as one unit. The communication networks described herein (for example, first communication network, second communication network, third communication network, and fourth communication network discussed above) can be a local area network, a wide area network, internet, intranet, Bluetooth network, infrared network, and/or any other communication network.

The computing device 128 can be a desktop computer, a laptop computer, a tablet computer, a phablet computer, a cellular phone, and/or any other computing device.

The semantic model 116 can be generated at design-time. The text processors 112 can read new text 117 and distill it into semantic representation 126 at processing-time or ingest-time. The query processors 114 interpret questions 106 and find answers 104 using the semantic database 102 at query-time. In some implementations, the generation of the semantic database 102 at design-time and the distilling of text 117 into semantic representation 126 at processing-time can occur first, and the querying at query-time can occur subsequently. In alternate implementations, the distilling of text 117 into semantic representation 126 at processing-time can continue to occur simultaneously with the querying at query-time. The ongoing processing while querying can allow more content to be ingested into the semantic database 102 while users query the content, thereby potentially improving answers 104.

Overview of Interpretation of Source Text

FIG. 2 is a diagram 200 illustrating the conversion of text 117 into intermediate logical statements 202 and finally into semantic representations 126 by text processors 112. Text processors 112 can receive text 117 from text sources 118, such as web pages 120, internal documents 122, and/or other text sources 124. The text processors 112 can convert the text 117 into intermediate logical statements 202 (as discussed below by diagrams 300 and 400). Subsequently, the text processors 112 can convert the intermediate statements 202 into semantic representations 126 (as discussed below in more detail by diagrams 700 and 800). The text processors 112 can use a semantic model 116 (a simplistic example of which is discussed by diagram 500, and generation of which is described by diagram 600) to convert the intermediate statements 202 into the semantic representations 126.

Conversion of Text to Intermediate Logical Statements

FIG. 3 is a diagram 300 illustrating a conversion of an exemplary sentence 302 in exemplary source text 117 to intermediate statements 202 by text processors 112. The text processors 112 can preprocess the text 117. The preprocessing can include parsing an exemplary sentence 302 in the source text 117 to form a dependency parse tree 304 which may chunk noun, verb, and other phrases to simplify further processing. The dependency parse tree 304 is shown using Stanford dependencies, but other dependency representations may be used as well. An entity extractor may also identify entities (for example, people, organizations, and locations), and these may be resolved for coreference within and across text sources, so that each real-world entity has a unique identifier. Words may also be disambiguated for sense, so that each word is mapped to an unambiguous sense number. For example, the word "plant" would be assigned a sense number that indicates whether it means a factory or a living organism. These sense numbers also serve to group synonymous words, so that e.g. the adjectives "big" and "large" might be equated. Word-sense disambiguation may not be necessary for verbs, as this is usually done when selecting a binding to a semantic frame. But in some implementations, in addition to content words such as nouns and adjectives, prepositions may also be disambiguated for sense, so that they are assigned sense numbers indicating the type of information they provide (such as location or time). In alternate implementations, entity extraction, coreference resolution, and word sense disambiguation may be performed at other phases of processing.

The text processors 112 can then convert the parse tree 304 into the intermediate logical statements 202, using the steps described in diagram 400. The intermediate logical statements 202 are a representation of statements that abstracts over the syntactic form in which they appear. In the example in diagram 300, the dependency parse is decomposed into four intermediate logical statements 202. As shown in the diagram 300, the intermediate logical statements 202 can be represented by simple trees 306, which generally contain one verb, its logical subjects and objects, prepositional phrases, and other noun and verb modifiers. These eliminate numerous grammatical constructs, such as verbals, conjunctions, appositives, pronouns, relative pronouns, possessives, verb voice, and indirect objects. They retain only the core logical elements for each statement, independent of grammatical form.

The statements 202 remain intermediary, however. Two intermediate logical statements 202 with the same form may have different meanings: "Tom play piano" and "Tom play Hamlet". Moreover, two statements with different forms may have the same meaning: "Sam study at Yale" and "educate Sam at Yale".

Note that the entities in the intermediate logical statements 202 in diagram 300 are represented by unique identifiers (IDs) (such as "fk3" for the "Eiffel Tower"), and the nouns and other modifiers have been disambiguated to senses indicated by numbers (such as "132" for "tower"). Although the intermediate logical statements 202 are properly represented using these tree structures 306 with unique IDs and sense numbers, for the purpose of clarity, they are abbreviated here with short sentence-like expressions. These expressions, which are shown above the corresponding trees in diagram 300, are relatively unambiguous, and the implied trees are usually clear.

FIG. 4 is a flow-diagram 400 illustrating the generation of intermediate logical statements 202 from text 117 by text processors 112. Text processors 112 can receive, at 402, text 117 from text sources 118.

The text processors 112 can preprocess the text 117 at 404. The preprocessing can include parsing, entity extraction, coreference resolution, and word-sense disambiguation, as described above in relation to diagram 300, to generate a dependency parse tree 304, along with supplemental annotations. The text processors 112 can then convert the dependency parse tree 304 into intermediate logical statements 202.

At 406, the text processors 112 can replace relative pronouns (such as "who", "that", and "which") with their referents, and replace "whose" by the appropriate possessive. For example, the text processors 112 can perform the following: "Sam, who was born in Hawaii, . . ."→"Sam was born in Hawaii". Also: "the woman whose purse Tom stole . . ."→"Tom stole the woman's purse".

Similarly, the text processors 112 can replace, at 408, entity mentions (for example, pronouns and definite nominals) with canonical mentions, and possessive pronouns with the appropriate possessives. This substitution uses the global IDs and canonical names computed by the coreferencer during preprocessing. For example, the text processors 112 may substitute a referent "Thomas Jefferson" for "he", "Jefferson", or "the president", and may substitute the possessive "Thomas Jefferson's" for "his".

The text processors 112 can then identify, at 410, roots of the intermediate logical statements (which are to be generated) from verbs and verbals, the roots corresponding to the roots of the tree representations 306. Most verbs and verbals may be roots; in some implementations, these may be filtered to exclude certain forms, such as those indicating hypotheticals or beliefs instead of asserted facts.

At 412, appositives may be converted to statements with the root "be". For instance, the text processors 112 may convert: "Sam, the first son of Peter, . . ."→"Sam is the first son of Peter". Determining the logical subject and logical object is later done as with other "be" verbs.

At 414, event nouns, such as "murder" or "purchase", may be converted to statements with the dummy root "happen". For instance, the text processors 112 can convert: "After Sam's purchase of the boat, . . ."→"Sam's purchase of the boat happened". Such a form can be equated to the form, "Sam purchased the boat" later during the semantic interpretation phase. In the case of possessives of non-event nouns, explicit possession statements may be constructed using "X's Y"→"X has Y". For example, "Sam's degree from Yale"→"Sam has a degree from Yale".

The text processors 112 can decompose, at 416, additional special constructs using case-specific rules to identify further statements. For example, the text processors 112 can simplify "including" and "such as" constructs. In general, if a statement in the parse tree involves "A including X", the text processors 112 generate from this statement intermediate logical statements 202 with simply "A", the membership assertion "X be A", and the statement with X substituted for A. For example, for a statement "Shakespeare wrote many plays, including Hamlet and Macbeth"302, the basic form, membership, and substitution are as follows. Basic form: "Shakespeare wrote many plays". Membership: "Hamlet is a play", and "Macbeth is a play". Substitution: "Shakespeare wrote Hamlet", and "Shakespeare wrote Macbeth".

For another special construct, the text processors 112 can expand the form "X is Y prep Z" where "prep" is a preposition besides "of" and modifies Y. The text processors 112 can keep the original form, and also include this decomposition: "X is Y prep Z"→"X is Y. X is prep Z." For example: "the Washington Monument is an obelisk in Washington D.C."→"the Washington Monument is an obelisk"; and "the Washington Monument is in Washington D.C." In another example: "Moby Dick is a novel by Herman Melville about a whale"→"Moby Dick is a novel"; "Moby Dick is by Herman Melville"; and "Moby Dick is about a whale". In this case, each element provides an independent piece of information about the subject.

For another special construct, the text processors 112 can decompose noun phrases of the form [Organization] [Position] [Person] to mean [Person] is [Position] of [Organization]. For instance, "SNC CEO Fatih Ozmen"→"Fatih Ozmen is the CEO of SNC". In some implementations, similar rules may address additional special grammatical constructs.

After identifying the root of each statement 202 using the above-noted steps, the text processors 112 can proceed to identify arguments and modifiers for each intermediate logical statement 202 (to be generated), as well as perform further simplifications and reductions. The text processors 112 can begin by identifying, at 418, logical subjects and objects of each intermediate logical statement 202 (to be generated). In the intermediate logical statement 202, direct objects and subject complements may not be distinguished; both may be labeled as objects.

If the root of the statement 202 (to be generated) corresponds to an active verb, syntactic subjects are generally the logical subjects of the statement 202 and syntactic objects are generally the logical objects of the statement 202. One exception to this is some "be" statements: if the syntactic subject is a common noun and the syntactic object (subject complement) is an entity, then the entity is taken as the logical subject and the common noun is taken as the logical object. For example, "another contestant is Eric" is switched to "Eric is another contestant". In another example, the appositive "Tom's friend Mary", which is converted into the statement "Tom's friend is Mary", is now standardized to "Mary is Tom's friend".

If the root of the statement 202 corresponds to a passive verb, the syntactic subject is usually the logical object and the logical subject may appear as the object of a modifying "by". For example, in "the apple was eaten by the boy", the logical object of "eat" is the apple and the logical subject is the boy. If a passive verb contains a syntactic object, then instead the syntactic subject is usually the logical indirect object, the syntactic object is the logical (direct) object, and the subject may still appear as the object of a modifying "by". For example, "Sam was awarded a trophy" with root "award" has logical indirect object "Sam" and logical (direct) object "trophy". Logical indirect objects are later converted to prepositional forms, so that this example would be transformed into "(someone) awarded a trophy to Sam".

If the verb is a coordinated verb, these same rules may be used, but with the syntactic subject given by the first verb in the coordination. For example, the treatment of "eat" is the same as in the earlier example if the sentence is "the apple grew in the orchard and was eaten by the boy".

If the root of the statement 202 (to be generated) corresponds to a past participle, then the modified noun serves as the logical object and the logical subject may appear as the object of a modifying "by". For example, in "the apple eaten by the boy was rotten", the logical subject of "eat" is "boy" and the logical object is "apple".

If the root of the statement 202 corresponds to a present participle, the modified noun is the logical subject, and the objects of the participle are the logical objects. For example, with "the boy eating the apple", the logical subject of "eat" is "boy" and the logical object is "apple".

For gerunds and infinitives, the syntactic object is generally the logical object. In some cases, a logical subject can be identified as well. For instance, if a gerund is the object of "after", "before", "while", or "since", and this modifies a verb, then the gerund's logical subject is usually the syntactic subject of the modified verb. For example, with "after visiting Paris, Tom went to London", the logical subject of "visiting" is "Tom" (i.e. "Tom visit Paris"). In another case, if a gerund is the object of a verb such as "start", "stop", "begin", or "continue", then the gerund's logical subject is usually the syntactic subject of the verb. In the example "Tom started driving to New York", the logical subject of driving is "Tom".

After identifying the logical arguments of statements 202, the text processors 112 can identify, at 420, prepositional and other modifiers. In general, prepositions may modify the root verb, one of its arguments, or the object of another preposition. These modifiers can usually be directly transferred from the dependency parse without modification. In some implementations, certain special constructs can also be converted into prepositional forms. For instance, a temporal modifier such as "yesterday" may be converted into the appropriate prepositional form "on [date]", where the date is computed as the day preceding the source document's date. Adjectives, adverbs, and other modifiers that are internal to verb or noun chunks may also be extracted, so that "free email service" will have "free" and "email" modifying "service" and "first appeared" will have "first" modifying "appear". These modifiers are usually directly transferred from the dependency parse.

Some implementations may further standardize noun phrases using various rules or models. For instance, "NBA player" might be equated to "player in the NBA" and "player of the NBA" by standardizing the position of "NBA". Similarly, "Roosevelt economic advisor" might be equated to "economic advisor to Roosevelt" or "economic advisor for Roosevelt".

The text processors 112 can convert, at 422, possessives into prepositional forms. In most cases, the text processors 112 perform the following conversion: "X's Y"→"Y of X". For example, the text processors 112 perform the following: "Sally's mother"→"the mother of Sally". In some cases, prepositions other than "of" are more appropriate. For example, "by" is often a better choice for authorship, as in "Mozart's concerto"→"concerto by Mozart". Similarly, "in" is often a better choice for location, e.g. "France's highest mountain"→"highest mountain in France". The best choice of preposition in various contexts can be determined by statistical analysis of the frequencies of prepositional analogs. In the case of expressions with the form "X's Y of Z", where Y has an existing "of" modifier, the most common preposition to replace the possessive is then "by". The text processors 112 then usually perform the following: "X's Y of Z"→"Y of Z by X". For example, the text processors 112 perform the following: "Tom's murder of Sam"→"the murder of Sam by Tom".

At 424, the text processors can convert indirect objects into prepositional forms. The indirect object is replaced by a prepositional modifier with a preposition dependent on the verb (usually "to" or "for"). In the example "Tom gave Mary a book" with root "give", logical subject "Tom", and logical object "book", the indirect object "Mary" is incorporated as the prepositional modifier "to Mary": "Tom gave a book to Mary". In the example "Sam was awarded a trophy" with root "award" and logical object "trophy", the syntactic subject "Sam" is the logical indirect object, and is converted into "to Sam", effectively yielding "(someone) awarded a trophy to Sam".

The text processors 112 can distribute, at 426, over conjunctions such as "and" or "as well as." For example, the text processors 112 can perform the following: "Tom and John sold apples, oranges, and bananas"→"Tom sold apples"; "Tom sold oranges"; "Tom sold bananas"; "John sold apples"; "John sold oranges"; and "John sold bananas". This typically converts a single statement in the parse tree 304 into several intermediate logical statements 202.

In some implementations, the text processors 112 can substitute, at 428, variables for subordinate clauses. For example: "George said he will run for president"→"George said X", where X="George will run for president". Thus, the text processors 112 can preserve the relationship between these statements through the use of variables (such as X), but each statement can be standardized independently. In this case, the type of the variable X would be indicated as a clause for the purpose of interpreting "George said X", as opposed to most variables which are assigned various noun types.

Some implementations may incorporate additional constructs in order to properly represent such concepts as quantification, disjunction, and uncertainty. Although such concepts can further extend the capabilities of the semantic interpretation system, the system's focus is on ground predicates. The system primarily aims to convert the numerous natural language surface forms of these assertions into canonical relations and events pertaining to specific real-world entities.

In some implementations, the text processors 112 may identify certain modifiers, such as temporal modifiers, as supplemental. Supplemental modifiers can be ignored for the purpose of identifying a semantic representation 126, and remain in the same form in the final interpretation.

The text processors 112 can execute 402 to 428 on the text 117 to decompose the text 117 into intermediate logical statements 202 with corresponding statement trees 306. Diagram 300 shows a full example, in which a sentence is parsed into a parse tree 304 and then decomposed into four intermediate statements 202. These statements abstract over grammatical form, eliminating numerous constructs included in the original sentence 302. Moreover, by the incorporation of word-sense disambiguation and entity coreference resolution, these statements 202 contain canonical forms of noun and adjective expressions. As earlier discussed, however, they do not yet directly correspond to meanings. The next step, as shown on diagram 200, is to assign each statement an unambiguous semantic representation 126 by using a semantic model 116.

Semantic Model

One important feature of the semantic model 116 is the modeling of types, both for variables and for constants. The text processors 112 can fit both the variables and constants into a preset tree-based type hierarchy, with variables constrained by sets of valid and/or invalid types, and common noun constants each mapped to a single type (its word sense). The preset tree-based type hierarchy can be an organization of types into a tree, such that the most general types are at the top of the hierarchy and the most specific types are at the bottom of the hierarchy. In one example of such a type hierarchy, "dog" can be under "canine," which can be under "mammal," which can be under "animal". The text processors 112 also assign one or more types to named entities such as people, organizations, and locations, ideally using maximally specific types such as "woman" or "company" or "country". For the purpose of matching common noun constants, types match all of their ancestors; for example, "piano" is considered a match for "instrument," which is an ancestor of "piano." Generally, more specific matches are preferred. In some implementations, common noun constants can simply appear as words, although they generally represent types in most implementations.

The text processors 112 can also assign multiple types to entities; for example, a person might be categorized as a man, a lawyer, and an author. Entities may initially be assigned one or more types by the entity extractor. The text processors 112 may also infer many additional types from the text sources 118. These types may be inferred from intermediate logical statements of the form "X be Y", which may originate in the text in the form of "is-a" assertions, appositives, and other constructs such as "including" and "such as". Because entities are resolved for coreference across documents, type information about entities from all documents can be combined, and these types may be used in all documents to accurately interpret semantics of statements. The assignment of multiple specific types to entities enables frames to specify more precise type constraints, which may vary in specificity. This can additionally enable accurate interpretation of otherwise vague patterns. For instance, the vague pattern "X be home of Y" can be used to identify a sports team's home stadium TEAM_STADIUM (X, Y) in the context that X is a sports team and Y is a stadium. Then combining information from one document that indicates the Orioles are a sports team, another document that indicates Camden Yards is a ballpark, and another document that indicates, "Camden Yards is the home of the Orioles", can lead to the conclusion TEAM_STADIUM (Orioles, Camden Yards). In another example, the vague pattern "X defend Y" might be used to infer DEFENSE_LAWYER_OF(X, Y) if X is known to be a lawyer. In the example in diagram 200, several assertions are specialized from the AUTHOR frame to the AUTHOR_PLAY frame because the entities are plays. For instance, AUTHOR (Shakespeare, Macbeth) is specialized to AUTHOR_PLAY (Shakespeare, Macbeth).

FIG. 5 is a diagram 500 illustrating one simplistic example of a semantic model 116 that is used for conversion of intermediate statements 202 to semantic representation 126, and for conversion of the intermediate queries derived from questions 106 to semantic queries 130. The semantic model 116 can include frames 502, which may have child frames 504 with narrower meanings. The frame 502 can include patterns 506. Each pattern can be in the form of an intermediate logical statement 202, but where some or all nouns are replaced by variables, such as X and Y. Each frame may also contain constraints on the types of the variables, and in some implementations can contain type distributions for variables. Frames may also contain lateral (non-hierarchical) implications 510 to other frames that indicate additional knowledge that may be inferred. The semantic model 116 can be generated by one or more processors, which can be text processors 112 in some implementations, and processors external to the distributed computing system 110 in some other implementations (as discussed in more detail below in relation to diagram 600).

In general, a semantic model 116 can include a hierarchy of frames. Each frame represents a specific type of relation (for example, parenthood, ownership, and/or any other relation) or event (for example, theft, acquisition, and/or any other event). Each frame can contain multiple variables, such as X and Y, and each pattern within each frame may also contain specific constants, such as "author" in "X be author of Y".

Further, in general, each frame can be described by the following six characteristics, enumerated as (a), (b), (c), (d), (e), and (f).

(a) A set of variables serving roles in the relationship or event: These roles can include traditional thematic roles, such as agent, theme, or beneficiary. In general, these roles need not be explicitly identified, because they are defined by their usage in the patterns of the frame. A frame may contain any number of variables, such as X, Y, Z, as noted below. Examples of patterns with one variable can be: "X be drummer"; and "X die". Examples of patterns with two variables can be: "X graduate from Y"; and "X be alumnus of Y". Examples of patterns with three variables can be: "X sell Y to Z"; and "Z buy Y from X".

(b) A set of patterns that express the meaning of the frame: each pattern can appear as an intermediate logical statement that can include a verb, one or more variables of the frame, and possibly other constants. All patterns in a frame should have equivalent meanings. In particular, modifiers must apply equally well to all of them. Thus, although a first pattern "X graduate from Y" and a second pattern "X be alumnus of Y" logically imply each other, they are not identical, because the first pattern is an event and the second pattern is a relation. In this case, temporal modifiers do not apply identically. Accordingly, the first pattern and the second pattern should appear in distinct frames, which can be linked with lateral implications (as discussed below). For simplicity, the semantic model in diagram 500 violates this principle: it treats "write" as a relation. A more accurate model would distinguish it as an event (possibly with a location and time) in its own frame that implies and is implied by the authorship relation frame.

Diagram 500 shows several examples of frames and their patterns, including a TEACH frame 512 with the following patterns, where X is a teacher, Y is a subject, and Z is a student: "X teach Y to Z"; "X teach Y"; "X teach Z". The same pattern form or structure can appear in multiple frames or even multiple times in the same frame (as with "X teach Y" and "X teach Z" above). In these cases, the meaning of a statement with this pattern form is ambiguous and the appropriate interpretation is chosen during the interpretation process.

(c) Type specifications for each variable for the frame. Each variable may have collections of allowed types and disallowed types, or may be unconstrained. Each frame inherits variable type constraints from its ancestor frames, but may provide additional, more-specific constraints. In the example above, the variable Z may be specified as a "person", whereas variable "Y" may be specified as a "subject", which might include history, math, and languages. In some implementations, additional type information may be specified in the form of type probability distributions for each variable. These probability distributions may model how types are generated by each variable for a given frame.

(d) Any number of child frames, with the following two ((1) and (2)) kinds of children distinguished: (1) Specializations that can be inferred based only on the types of the variables; for example, KNOW(X, Y) means SPEAK(X, Y) when Y is a language. In diagram 500, the "→" preceding child frame names indicates that they permit specialization. (2) Specializations that cannot be inferred based on the types of the variables; for example, GO_TO(X, Y) has a narrower sense FLY_TO(X, Y). In this case, "fly" is one specific way to "go", but this narrower sense cannot be inferred based only on the values of variables X and Y. This hierarchy combining two kinds of children is useful, as it enables rapid hierarchy-based inferences at query time for both kinds. All children of a given pattern must refer to the same relation or event, only with more specificity. Accordingly, modifiers must apply equally well to parent and child. Non-identical patterns can be linked with lateral (non-hierarchical) implications.

(e) A set of lateral (non-hierarchical) implications to other frames, along with the appropriate variable mappings for those frames. Implications 510 shows that TEACH(X, Y, Z)→KNOW(X, Y) and KNOW(Z, Y). Some implementations may allow for more sophisticated logical inferences relating to e.g. time or location, such as that if a person writes a book at time T, then they are the book's author at all times t>=T.

In most implementations, frames are required to form a strict tree without any multiple inheritance. As a result, frames can be efficiently encoded using representations such as the nested set model. In the nested set model, each frame can be represented with a numeric interval [a, b] such that the intervals for all descendants are contained within this numeric interval. This enables efficient querying for relations and events matching a particular frame (including all descendant frames).

Semantic Model Generation

In general, semantic models can be generated in many ways. Because the models are based on concise intermediate logical statements, which abstract over numerous grammatical variations, manual development and refinement of models is highly feasible. Moreover, most existing algorithms that might be adapted for model construction, such as those for automatically identifying paraphrases, can be error-prone, and can require manual review of results for high accuracy. In general, one effective approach to generating a semantic model is to use algorithms to identify candidate semantic links and clusters, which are possibly refined with manual review.

FIG. 6 is a flow-diagram 600 illustrating one method of generating a semantic model 116 with the aid of processors. In some implementations, these processors can be text processors 112. In alternate implementations, the processors can be one or more microprocessors external to the distributed computing system 110 such that the semantic model 116 is generated externally.

The processors can receive, at 602, intermediate logical statements 202. The processors can substitute, at 604, variables (e.g. X, Y) for one or more nouns (e.g. Alex, banana) in statements (e.g. "Alex eat banana") to generate corresponding statement patterns (e.g. "X eat Y"). The processors can exploit, at 606, coreference information to obtain candidate semantic links between patterns (i.e. possible equivalence or entailment relationships). Some implementations may simply match names or words instead of using a more sophisticated coreference resolution strategy. Two patterns P and Q may have a semantic link if their variables can be aligned to have equivalent bindings—that is, so that their named entities have the same IDs (i.e. refer to the same real-world entities) and their common noun variables have the same senses. The processors can cluster, at 608, patterns using a variety of scoring metrics based on frequencies of semantic links, patterns, etc. Finally, manual review at 610 can refine the clusters into a frame hierarchy. The level of human effort is minimized by the use of intermediate logical statements 202: humans need only review small collections of distinct statement patterns, not the numerous grammatical variations that may appear in the original text or in a dependency parse.

Conversion of Intermediate Logical Statements to Semantic Representation

FIG. 7 is a diagram 700 illustrating an example of the conversion of an intermediate logical statement 202 into a semantic representation 126 by text processors 112. FIG. 8 is a flow-diagram 800 illustrating the general process for this conversion. The process of interpretation is based on a semantic model 116, with the model shown in diagram 500 used for the example diagram 700. Diagram 700 shows a sample sentence 302 from source text 117: "Sam, a new lecturer, taught French in 2003." This sample sentence is initially parsed and decomposed into intermediate logical statements 202, using the process explained in diagrams 300 and 400. The conversion into semantic representation 126 then begins when the intermediate statement is received at 802. In this example, the intermediate statement is "Sam teach French in 2003". Note that in some implementations, an intermediate statement may be immediately interpreted for semantics. In other implementations, all text may be converted to intermediate statements 202, and those intermediate statements 202 may all be analyzed e.g. to extract entity types, after which all intermediate statements 202 may be interpreted for semantics.

The text processors 112 can identify, at 804, all pattern forms that match the statement. A pattern form is a statement pattern with undistinguished variables (e.g. "*teach*" or "*teach*to*"). A pattern form matches a given statement if it contains the same verb and each element of the pattern form has a corresponding element in the statement. For instance, "*teach*" matches "Sam teach French in 2003".

At 806, the text processors 112 can select the best pattern form 702 that binds to the most elements and is maximally specific. First patterns that bind to more elements of a statement are preferred. For the example "Sam buy book from John", "*buy*from*" would be preferred over "*buy*". Next the text processors prefer patterns that are maximally specific, i.e. those that have constants instead of variables and have maximally specific constants. Using "Sam receive PhD from Yale" as an example, "*receive PhD from *" would be preferred to "*receive degree from*", which would be preferred to "*receive*from *". In the example in diagram 700, there is only one matching pattern form "*teach*", so that is selected as the best pattern form 702.

At 808, the text processors 112 can identify all patterns in all frames of the semantic model 116 that match the chosen pattern form 702. In the example 700, the matching patterns 704 are two patterns in the TEACH frame: "X teach Y" and "X teach Z". The text processors 112 can then determine, at 810, what interpretations correspond to each matching pattern 704. An interpretation (or semantic representation 126) of a statement is defined by a frame, bindings for some or all of its variables, and possibly supplemental modifiers. In the example 700, the pattern "X teach Y" yields the interpretation TEACH(X: Sam, Y: French, time: 2003), with French as a subject Y, and the pattern "X teach Z" yields the interpretation TEACH(X: Sam, Z: French, time: 2003), with French as a student Z. Note that in this example, time is considered a supplemental modifier.

Next, at 812, the text processors 112 can choose the best interpretation 706 based on variable types. Valid interpretations may be determined based on variable type constraints. In this example, TEACH(X: Sam, Z: French, time: 2003) is invalid because French is not a person, as required for the variable Z. The interpretation TEACH(X: Sam, Y: French, time: 2003) is valid, because X=Sam is a person, as required, and Y=French is a subject, as required. If there is only one valid interpretation, that interpretation is chosen, and all others are rejected. If there are multiple valid interpretations, the interpretation process may be aborted as ambiguous, or else variable type distributions, if available, may be used to determine the most probable of the valid interpretations. In the example diagram 700, the interpretation TEACH(X: Sam, Y: French, time: 2003), which considers French to be a subject rather than a student, is the best interpretation 706, and the other interpretation 708 is rejected. When specializations of the interpretation 706 exist, step 814 is applied. Because there are no specializations of the interpretation 706 in this example, step 814 does not apply, so the text processors 112 can proceed, at 816, to add this fact to the database 102.

At 818, the text processors 112 can determine one or more assertions implied by the chosen interpretation 706. Because the semantic model indicates that TEACH(X, Y, Z) implies KNOW(X, Y), the text processors 112 can deduce assertion 710, KNOW(X: Sam, Y: French). In general, supplemental modifiers do not transfer from a fact to the facts it implies, but some implementations may allow the specification of transforms for e.g. temporal modifiers. The text processors can then specialize, at 814, the assertion if its frame contains child frames permitting specialization, and the more restrictive type constraints of a single child frame are satisfied. Because Y=French is a language, as required for SPEAK(X, Y), the interpretation 710 is specialized to assertion 712, SPEAK(X: Sam, Y: French). Next, at 816, this fact is added to the database 102. As there are no additional implications to infer, the interpretation process is complete.

Semantic Database

FIG. 9 is a diagram 900 illustrating a semantic database 102 including a facts table 902 storing semantic representations 126 of text 117. Data is stored in the semantic database 102, and the stored data can be used for many purposes, including providing answers 132 to semantic queries 130. The facts table 902 stores information about relations and events. Additional tables may be used to store related information, such as information about entities and entity types, and information for query disambiguation (which is described in diagram 1200). In some implementations, these tables may be normalized or replicated with different lookup keys or otherwise transformed. Moreover, although a table 902 is described for storing the semantic representation, in other implementations, other forms of storage are also possible, such as a hierarchical tree structure, serial storage, and/or any other form of storage. In the facts table 902, each record corresponds to a single citation for a fact, and equivalent facts may appear in many records, one for each citation. In some implementations, facts may be resolved for coreference e.g. based on the equivalence of their variable bindings, so that each distinct fact appears once and has many associated citations. Some implementations may also store intermediate logical statements 202 in addition to interpreted facts. In the case that the semantic model does not provide an interpretation for an intermediate statement, the statement may still be used to match queries and answer questions. It can match questions with numerous grammatical variations, but will not match questions that use structurally distinct paraphrases (those require semantic interpretation).

Overview of Question Interpretation

FIG. 10 is a diagram 1000 illustrating the generation of semantic queries 130 based on questions 106 by query processors 114. The query processors 114 can receive questions 106 from the users 108. The query processors 114 can convert the questions 106 into intermediate logical subqueries 1002. The conversion to intermediate subqueries 1002 can be a process similar to the process (as shown in diagrams 300 and 400) performed by text processors 112 for generating intermediate statements 202. The query processors 114 can use the semantic model 116 in addition to the disambiguation table (described in relation to diagram 1200) to generate one or more semantic subqueries, which include unknown values (shown using "?") of at least some variables, such as X or Y. The semantic query 130 consists of one or more semantic subqueries that are joined together. In the examples in diagram 1000, each semantic query 130 consists of only a single semantic subquery. The semantic database 102 can match the semantic subqueries to stored semantic representations 126 to retrieve the unknown values ("?") of variables. In some cases, the semantic database 102 may also need to join results of subqueries together to identify the answers 132 to the corresponding query 130. The query processors 114 can then send the answers 132 to the user. In some implementations, the query processors 114 can aggregate or otherwise combine answers 132 to create answers 104, which can then be sent to the computing devices 128 that can display the answers 104 to the users 108.

FIG. 11 is a flow-diagram 1100 illustrating the determination of answers 104 to a question 106 by query processors 114. The query processors 114 can receive, at 1102, a question 106 from the users 108. Note that the question may not have the correct capitalization, e.g. it might be lowercase, which differs from most source text and presents additional ambiguities for the query processor to resolve. The query processors 114 can preprocess, at 1104, the question 106 by parsing it and converting it into a declarative form. Parsing is performed as for processing source text. Conversion into declarative form is a simple transformation that adjusts for inversions and wh-movement, changing e.g. "what did Edison invent?" into "Edison invented what".

Next, at 1106, the query processors 114 can identify query variables. Many query variables appear explicitly in the form of "who", "what", "when", "where", "why", and "how". In some cases, type constraints are incorporated into query expressions; these can extracted as additional query statements. For instance, "what instruments did Mozart play?" can yield "Mozart play what instruments", which has the query expression "what instruments" and can be changed to the two query statements "Mozart play X. X be instrument.", with query variable X. In some implementations, additional logic may be used to identify implicit query variables, which may be similarly extracted. For example, the question "what Carnegie Mellon graduates founded startups?" contains a primary query variable X corresponding to "what Carnegie Mellon graduates". Additionally, the expression "startups" may be identified as an implicit query variable Y, yielding query statements, "X be Carnegie Mellon graduate. X found Y. Y be startup." In general, these implicit query variables can be identified based on whether they are common types for named entities, whether they have additional modifiers, and other syntactic considerations.

The query processors 114 can proceed, at 1108, to decompose the parse trees into intermediate logical subqueries. This process corresponds to the process for decomposing dependency parses, as previously discussed in relation to diagrams 300 and 400. For instance "what diseases cause headaches and dizziness", with parse trees for "X be disease. X cause headaches and dizziness.", would be further decomposed into, "X be disease. X cause headaches. X cause dizziness."

Next the query processors 114 can disambiguate, at 1110, each intermediate logical subquery using the disambiguation table. This step is show in diagram 1200, and is described in further detail in relation to that diagram. This yields a specific interpretation, consisting of a specific semantic frame with variables bound to specific entities and word senses. The interpreted subquery is a semantic subquery.

The query processors 114 can then send the entire semantic query 130, consisting of the collection of disambiguated semantic subqueries, to the database. The database 102 can determine, at 1112, matching records for subqueries and join the results of subqueries as necessary. For a given subquery, the database 102 can retrieve matching bindings for query variables from the facts table 902, along with supporting citations. When there are multiple subqueries, the database can perform a join operation to identify combinations of query variable bindings that jointly satisfy the subqueries. The join order can be determined using traditional database approaches, so that more tightly constrained queries can be evaluated first, and can inform and simplify later subqueries. For instance, with the question "what is the population of the capital of France?", with query statements, "X be population of Y. Y be capital of France.", the query "Y be capital of France." would be evaluated first, yielding the answer Y=Paris, which can simplify the other query to "X be population of Paris." Note also that in some implementations, type constraints such as "X be disease" may be treated differently from other subqueries, so that e.g. type constraints are used to filter answers instead of as full independent subqueries. The database 102 can send the resulting answers 132 to the query processors 114. The answers 132 may include supplemental information about the answers, such as citations to the original sources of information, or the full database records containing the answers.

In some implementations, at 1114, the query processors 114 may combine, filter, reorganize or otherwise post process the answers 132 to create answers 104. For instance, if asked about a company's acquisitions, the query processors 114 might enhance the basic list of acquired companies by incorporating supplemental information from the database. It might generate an entire answer table with columns such as company acquired, acquisition_price, and acquisition_date, based upon the full original acquisition event records retrieved from the database.

Finally, the query processors 114 can send, at 1116, the answers 104 to the computing device 128 on which the user 108 had input the question 106. The computing device 128 can display the answers 104.

Query Disambiguation

FIG. 12 is a diagram 1200 illustrating an example of the disambiguation of an intermediate logical subquery. This corresponds to the step 1110 in diagram 1100. Before this process occurs, the text processors 112 must build the disambiguation table 1202.

Based on an intermediate logical subquery 1002, the query processor 114 must determine a specific semantic interpretation characterizing a semantic subquery, the semantic interpretation consisting of a semantic frame, bindings to frame elements, and interpretations for each element. Nouns may be identified as common nouns or named entities, which sometimes involves determining the correct capitalization (e.g. "the tempest" or the play "The Tempest"), when the question is not correctly cased. For common nouns, the word sense must be identified. For named entities, the specific entity ID must be identified. The choice of the frame as well as each other element constitutes the interpretation. In some implementations, this interpretation may be determined in a process similar to the interpretation of source text, as described in relation to diagram 200.

Entities may be categorized by an entity extractor, and may be identified based on the most common referent for each entity name or through entity coreference resolution. The semantic frame may be chosen based on type compatibility for each variable, or based on variable type probability distributions if they exist. Although this approach is reasonable, it faces more difficulties with queries than with source text. There is much less context to use for resolving the identity of entities, and there may be insufficient information to determine the best semantic frame.

The disambiguation table 1202 provides a way to choose the best interpretation using a simple database lookup, based on an analysis of data in the facts table. It can simultaneously determine the best combination of the semantic frame and bindings for each element, resolving ambiguities in the choice of semantic frame, whether each element is a common noun or named entity, each common noun's word sense, and each named entity's ID. For instance, in the example, "when did Clinton go to Oxford?", it would determine that the best interpretation is when Bill Clinton studied at Oxford University as opposed to when he visited the city of Oxford or when Hillary Clinton or another Clinton studied at Oxford University (because Hillary Clinton never attended Oxford). This interpretation is chosen because there is more data about Bill Clinton studying at Oxford University than about any of the alternatives.

The purpose of the disambiguation table 1202 is to identify the best interpretation 1210 for each intermediate logical subquery. It assumes that it is given an intermediate logical subquery 1002, which contains a verb and various nouns/adjectives. The structure of the intermediate logical subquery 1002 is assumed to be accurate with regards to segmentation of elements. The disambiguation table 1202, then, specifies for each ambiguous surface form 1204 the corresponding unambiguous interpretations 1206. For the purposes of this discussion, the best interpretation 1210 is assumed to be the interpretation that yields the highest score field 1208. This score field may be simply a count of the number of facts with the specified interpretation. In other implementations, other criteria may be used, such as a weighted count that incorporates the probability of each interpretation 1206 generating each surface form 1204.

The disambiguation table may be generated by the text processors 112 based upon the facts table 902. In order to generate the disambiguation table 1202, the text processor 112 must compute for each fact in the facts table the corresponding surface forms 1204. Each component can be expanded to its own surface forms 1204, and these can then be combined to yield all surface forms 1206. Each semantic frame can generate intermediate logical statements 1002 corresponding to its patterns and the patterns of all ancestor frames. Each common noun can be expanded to its synonyms and hypernyms. Each named entity can be expanded to its known aliases.

In some implementations, the text processor 112 can omit some of these expansions to reduce the expansion factor. For instance, the text processors can omit many unambiguous surface forms. If a given frame or element has more than one unambiguous surface form, these may be stored in a separate lookup, and replaced by their interpretation (e.g. an ID or sense number). During disambiguation, then, the query processor 114 would first resolve any unambiguous forms, and then query for the updated combination. This reduces the expansion factor of an element to the number of ambiguous surface forms plus one (all unambiguous forms are combined into one). The text processors 112 may also omit various other surface forms, such as those that are very rare for an entity, or those that are too ambiguous (such as many people's first names).

Additionally, the text processor 112 usually would not store all combinations of all elements, but rather a subset that is useful for querying. For instance, it can store each verb-noun combination and each combination of the verb with two nouns. Those combinations can cover most subqueries, specifically those that contain one constant ("who wrote Macbeth?") or two constants ("who was born in Paris in 1984?") in addition to the query variable. Note that many questions 106 involving more than two constants are composed of multiple subqueries with no more than two constants each.

After the text processor 112 computes the expansions for all facts, it can compute the frequency of each interpretation, which can be used for generating the score 1208. In some implementations, the score may use a more sophisticated model, such as a probabilistic model. The score 1208 may incorporate the probability of each surface form 1204 being generated by each interpretation 1206, based on e.g. the distribution of aliases for each entity and distribution of patterns for each frame. In this case, the score 1208 is proportional to P(surface_form|interpretation)*P(interpretation), and the interpretation 1206 with the best score 1208 for a given surface form 1204 is the maximum a posteriori estimate.

The text processor 112 may then keep only higher-scoring interpretations, and discard lower-scoring ones. For a given surface form 1204, for each distinct matching frame, the highest scoring interpretation 1206 should be kept. Multiple frames must be kept because some frames may not be compatible with the query variables in a given query. The kept interpretations constitute the disambiguation table 1202.

This disambiguation table can then be used by the query processors 114 to disambiguate an intermediate logical subquery 1002 such as "WHO write julius caesar". This example uses lowercase, because in general, a user's queries may not be properly cased, and the query processor must determine the case. This step corresponds to step 1110 in diagram 1100. First, the query processor 114 computes the appropriate combination of elements, such as the verb and noun, or verb and two nouns. Usually, this is simply the intermediate logical subquery without its query variables. In this example, the combination is: verb="write", object="julius caesar". The database 102 can then retrieve the matching interpretations. Each interpretation must be checked for compatibility with the query variable: the query variable's role must exist in the chosen frame and it must have a compatible type. The database 102 then returns the highest-scoring interpretation that is compatible with the query variable(s). In the example of "WHO write julius caesar", the best interpretation 1210 is simply the interpretation with the highest score, i.e. the AUTHOR frame and the Julius Caesar play instead of the WRITE_TO (correspond with) frame and the person Julius Caesar. Note that the person interpretation for "Julius Caesar" is probably more common in general, but that this selects the play interpretation because of the context of the query.

Finally, the query processors 114 may proceed with the step 1112 from diagram 1100, which sends disambiguated queries 130 to the facts table 902 and receives answers 132 with citations in response. In this example, the query sent is "AUTHOR(?, Julius Caesar)", which yields a single answer, "Shakespeare", with numerous citations.

Other Implementations

Although the semantic database 102 has been described above to provide answers 104 to questions 106, in many implementations, the semantic database 102 can be used for other purposes as well, including all types of analysis that can be done with a database. In one implementation, the semantic database 102 can be used to generate entity profiles, which summarize all information known about each entity, such as a person or an organization. In another implementation, the semantic database 102 can be used to automatically generate timelines pertaining to entities. In another implementation, the semantic database 102 can be used to automatically generate maps of locations related to entities. This generation of maps can also be combined with timelines to see locations of various entities at different times. In yet another implementation, the semantic database 102 can be used to automatically generate one or more link-analysis charts showing relationships between entities.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, Bluetooth network, infrared network, or other networks.

Although a few variations have been described in detail above, other modifications can be possible. For example, the logic flows depicted in the accompanying figures and described herein may not require the particular order shown, or sequential order, to achieve desirable results. Other embodiments may be within the scope of the following claims.

What is claimed is:

1. A method comprising:
receiving by one or more text processors, text from one or more text sources;
converting, by the one or more text processors, the text into a plurality of intermediate logical statements that abstract over the syntactic form of information in the text;
converting, by the one or more text processors using a semantic model, each intermediate logical statement into a semantic representation that equates intermediate logical statements having equivalent meanings
such that
the semantic model comprises a plurality of frames, each frame representing a relation or event and comprising one or more variables serving roles in the relation or event and each frame comprising one or more equivalent patterns, each pattern having a form of an intermediate logical statement including at least one variable and comprising a definition of a logical form that corresponds to a plurality of logically equivalent grammatical forms;
sending, by one or more text processors, the semantic representation to a semantic database configured to store the semantic representation;
receiving a query from a computing device;
converting the query, by one or more query processors, connected to the semantic database into one or more semantic subqueries;
matching, by the semantic database, each semantic subquery to stored semantic representations and joining results as appropriate to determine one or more answers to the query; sending, by the one or more query processors, the one or more answers to the computing device from which the query was received.

2. The method of claim 1, wherein the text comprises a plurality of sentences.

3. The method of claim 1, wherein the one or more text sources comprise at least one of: web pages and internal documents.

4. The method of claim 1, wherein each intermediate logical statement corresponds to a tree having a root node, one or more other nodes, and one or more edges, the root node representing a verb in the intermediate logical statement, the one or more other nodes representing at least one of a logical subject, a logical object, prepositional objects, and other modifiers in the intermediate logical statement, and the one or more edges identifying relationships among the root and the one or more other nodes.

5. The method of claim 1, wherein each frame comprises constraints on types of the variables.

6. The method of claim 1, wherein the plurality of frames are hierarchically organized as at least one child frame and at least one parent frame, the at least one child frame expressing a meaning that is narrower than a meaning of the at least one parent frame, the at least one child frame logically implying the at least one parent frame.

7. The method of claim 6, wherein the at least one child frame permits specialization that allows facts in the at least one parent frame to be narrowed in meaning so as to belong to the at least one child frame.

8. The method of claim 1, wherein at least one frame is related to at least one other frame with a lateral implication such that facts in the at least one other frame are inferred non-hierarchically from facts in the at least one frame.

9. The method of claim 1, wherein the semantic model is generated using at least one processor, the generation of the semantic model comprising:
  receiving one or more intermediate logical statements that abstract over the syntactic form of the information in the text;
  substituting variables for nouns in the one or more intermediate logical statements to generate corresponding patterns;
  exploiting coreference information about nouns to obtain candidate semantic links between the corresponding patterns;
  clustering the linked patterns based on a similarity metric; and
  generating, based on a review of the clustered patterns, a frame hierarchy comprising a plurality of frames forming the semantic model.

10. The method of claim 9, wherein the at least one processor is the one or more text processors.

11. The method of claim 1, wherein the one or more text processors and the semantic database are connected via a communication network.

12. A method comprising:
  receiving by one or more text processors text for one or more text sources;
  converting, by one or more text processors, the text into a plurality of intermediate logical statements that abstract over syntactic form of information in the text, wherein the converting of the text into intermediate logical statements of the text by the one or more text processors comprises one or more of,
    parsing the text into a parse tree;
    extracting and labeling named entities;
    resolving entity mentions within and across documents for coreference;
    disambiguating word senses, so as to assign sense identifiers to words;
    replacing relative pronouns in the parse tree with corresponding referents;
    replacing entity mentions including pronouns and definite nominal in the parse tree with canonical mentions;
    identifying intermediate logical statements from at least one of verbs, verbals, appositives, event nouns, possessives, and special constructs in the parse tree;
    identifying for each intermediate logical statement the corresponding logical subjects, logical objects, prepositional phrases, and other modifiers from the parse tree;
    converting possessives from the parse tree into prepositional forms;
    converting indirect objects from the parse tree into prepositional forms; and
    distributing over conjunctions in the parse tree; and sub-substituting variables for subordinate clauses in the parse tree;
  converting, by the one or more text processors using a semantic model, each intermediate logical statement into a semantic representation that equates logical statements having equivalent meanings;
  sending, by one or more text processors, the semantic representation to a semantic database configured to store the semantic representation;
  receiving a query from a computing device;
  converting the query, by one or more query processors, connected to the semantic database into one or more semantic subqueries;
  matching, by the semantic database, each semantic subquery to stored semantic representations and joining results as appropriate to determine one or more answers to the query; and
  sending, by the one or more query processors, the one or more answers to the computing device from which the query was received.

13. A method comprising:
  receiving by one or more text processors, text from one or more text sources;
  converting, by the one or more text processors, the text into a plurality of intermediate logical statements that abstract over the syntactic form of information in the text;
  converting, by the one or more text processors using a semantic model, each intermediate logical statement into a semantic representation that equates intermediate logical statements having equivalent meanings
  such that
  the semantic model comprises a plurality of frames, each frame representing a relation or event and comprising one or more variables serving roles in the relation or event and each frame comprising one or more equivalent patterns, each pattern having a form of an intermediate logical statement including at least one variable and comprising a definition of a logical form that corresponds to a plurality of logically equivalent grammatical forms;
  sending, by one or more text processors, the semantic representation to a semantic database configured to store the semantic representation;
  receiving a query from a computing device;
  converting the query, by one or more query processors, connected to the semantic database into one or more semantic subqueries;
  matching, by the semantic database, each semantic subquery to stored semantic representations and joining results as appropriate to determine one or more answers to the query; sending, by the one or more query processors, the one or more answers to the computing device from which the query was received
  wherein the conversion of each intermediate logical statement into the semantic representation by the one or more text processors comprises:
    receiving the intermediate logical statement;

identifying candidate interpretations associated with the intermediate logical statement, a candidate interpretation being characterized by a frame, bindings for some or all variables of the frame, and possibly supplemental modifiers; and selecting, from the candidate interpretations, a best interpretation based on at least one of variable type compatibility and likelihood, the best interpretation characterizing the semantic representation;

wherein the conversion of each intermediate logical statement into the semantic representation by the one or more text processors further comprises:

specializing the selected interpretation to a narrower meaning as applicable based on at least one of variable type compatibility and likelihood;

deducing any applicable lateral implications from the specialized interpretation; and recursively specializing and deducing lateral implications for each new fact concluded from a lateral implication in order to generate the semantic representation.

14. A method comprising:

receiving by one or more text processors, text from one or more text sources;

converting, by the one or more text processors, the text into a plurality of intermediate logical statements that abstract over the syntactic form of information in the text;

converting, by the one or more text processors using a semantic model, each intermediate logical statement into a semantic representation that equates intermediate logical statements having equivalent meanings such that the semantic model comprises a plurality of frames, each frame representing a relation or event and comprising one or more variables serving roles in the relation or event and each frame comprising one or more equivalent patterns, each pattern having a form of an intermediate logical statement including at least one variable and comprising a definition of a logical form that corresponds to a plurality of logically equivalent grammatical forms;

sending, by one or more text processors, the semantic representation to a semantic database configured to store the semantic representation;

receiving a query from a computing device;

converting the query, by one or more query processors, connected to the semantic database into one or more semantic subqueries;

matching, by the semantic database, each semantic subquery to stored semantic representations and joining results as appropriate to determine one or more answers to the query; sending, by the one or more query processors, the one or more answers to the computing device from which the query was received;

wherein the conversion of each intermediate logical statement into the semantic representation by the one or more text processors comprises:

receiving the intermediate logical statement;

identifying candidate interpretations associated with the intermediate logical statement, a candidate interpretation being characterized by a frame, bindings for some or all variables of the frame, and possibly supplemental modifiers; and selecting, from the candidate interpretations, a best interpretation based on at least one of variable type compatibility and likelihood, the best interpretation characterizing the semantic representation;

wherein identifying the candidate interpretations by the one or more text processors comprises:

identifying matching pattern forms, a pattern form of the matching pattern forms being a pattern with wildcard characters in place of variables to indicate that the variables are undistinguished;

selecting, from the identified pattern forms, a pattern form that binds to the most elements of the intermediate logical statement and is maximally specific to the intermediate logical statement;

identifying patterns in frames that match the selected pattern form; and determining interpretations given by each matching pattern, the determined interpretations being the candidate interpretations.

15. A method comprising:

receiving, by one or more query processors, a question from a computing device;

converting, by one or more query processors, the question into one or more intermediate logical subqueries that abstract over the syntactic form of the question;

wherein the conversion of the question into the intermediate logical subqueries by the one or more query processors comprises one or more of:

parsing the question into a parse tree;

converting the parse tree into a declarative form;

identifying explicit and implicit query variables in the parse tree;

replacing relative pronouns in the parse tree with corresponding referents;

replacing entity mentions including pronouns and definite nominals in the parse tree statements with canonical mentions;

identifying intermediate logical subqueries from at least one of verbs, verbals, appositives, event nouns, possessives, and special constructs in the parse tree;

identifying, for each intermediate logical subquery, corresponding logical subjects, logical objects, prepositional phrases, and other modifiers from the parse tree;

converting possessives from the parse tree into prepositional forms;

converting indirect objects from the parse tree into prepositional forms; and distributing over conjunctions in the parse tree; and substituting variables for subordinate clauses in the parse tree;

converting, by the one or more query processors, each intermediate logical subquery into a semantic subquery in a representation that equates intermediate logical subqueries having equivalent meanings;

sending, by one or more query processors, the semantic query to the database, the semantic query being one or more semantic subqueries joined together;

retrieving, by one or more database processors, facts from the database that match the semantic subqueries;

joining, by one or more database processors, the facts when necessary to generate one or more answers to the question;

returning by one or more database processors, the joined facts to the one or more query processors; and sending, by one or more query processors, the one or more answers to the computing device.

16. The method of claim 15, further comprising:

combining, filtering, and reorganizing the one or more answers before sending the one or more answers to the computing device.

17. The method of claim 15, wherein the computing device executes a graphical user interface that displays the one or more answers to the question.

18. The method of claim 15, wherein each intermediate logical subquery corresponds to a tree having a root node, one or more other nodes, and one or more edges, the root node representing a verb in the intermediate logical subquery, the one or more other nodes representing at least one of a logical subject, a logical object, prepositional objects, and other modifiers in the intermediate logical subquery, and the one or more edges identifying relationships among the root and the one or more other nodes.

19. The method of claim 15, wherein the conversion of the intermediate logical subquery into the semantic subquery by the one or more query processors comprises:
identifying a surface form that corresponds to the intermediate logical subquery;
retrieving interpretations for the surface form from a disambiguation table in the database; and
selecting, from the retrieved interpretations, a highest-scoring interpretation that is compatible with query variables of the intermediate logical subquery, the highest-scoring interpretation characterizing the semantic subquery.

20. The method of claim 19, wherein the disambiguation table is generated by:
identifying patterns for each semantic frame, aliases for each entity, and words for each noun or adjective sense as surface forms;
generating surface forms for each interpreted semantic fact by combining the surface forms for the semantic frame of the fact with the surface forms of one or more frame elements; and
assigning scores to interpretations for each surface form.

21. The method of claim 20, wherein the scores for interpretations are computed as frequencies of the interpretations.

22. The method of claim 20, wherein:
the scores are proportional to P(surface_form|interpretation)*P(interpretation), the scores being computed as frequencies of the interpretations weighted by the probability of generating the surface form given the interpretation.

23. The method of claim 15, wherein the one or more query processors and the semantic database are connected via a communication network.

24. A system comprising:
one or more text processors receiving text from one or more text sources, the one or more text processors converting the text into intermediate logical statements that abstract over syntactic form, the one or more text processors converting each intermediate logical statement into a semantic representation that equates intermediate logical statements having equivalent meanings;
a semantic database connected to the one or more text processors, the semantic database receiving the semantic representation from the one or more text processors, the semantic database storing the semantic representation;
one or more query processors connected to the semantic database, the one or more query processors receiving a question from a computing device, the one or more query processors converting the question into one or more intermediate logical subqueries that abstract over syntactic form, the one or more query processors converting each intermediate logical subquery into a semantic subquery in a representation that equates intermediate logical subqueries having equivalent meanings, wherein the converting into a semantic subquery uses a semantic model that comprises a plurality of frames, each frame representing a relation or event and comprising one or more variables serving roles in the relation or event and each frame comprising one or more equivalent patterns, each pattern having a form of an intermediate statement including at least one variable and comprising a definition of a logical form that corresponds to a plurality of logically equivalent grammatical forms, the semantic database matching each semantic subquery to the stored semantic representations and joining results as appropriate to determine one or more answers to the question, the one or more query processors sending the one or more answers to the computing device that outputs the one or more answers.

25. A system comprising:
one or more text processors receiving text from one or more text sources, the one or more text processors converting the text into intermediate logical statements that abstract over syntactic form and converting each logical statement into a semantic representation that equates logical statements that have equivalent meanings, wherein the converting into a semantic representation uses a semantic model that comprises a plurality of frames, each frame representing a relation or event and comprising one or more variables serving roles in the relation or event and each frame comprising one or more equivalent patterns, each pattern having a form of an intermediate statement including at least one variable and comprising a definition of a logical form that corresponds to a plurality of logically equivalent grammatical forms;
a semantic database connected to the one or more text processors and receiving and storing the semantic representation; and
one or more query processors connected to the semantic database, the one or more query processors receiving a query from a computing device and converting the query into one or more semantic subqueries,
wherein the semantic database matches each semantic subquery to stored semantic representations and joins results to determine one or more answers to the query, the one or more query processors sending the determined one or more answers to the computing device.

26. The system of claim 25, wherein:
the one or more query processors use the semantic model to convert the question to the semantic query.

27. The system of claim 26, wherein:
the one or more text processors and the semantic database are connected via a first communication network; and
the one or more query processors and the semantic database are connected via a second communication network.

28. The system of claim 27, wherein the first communication network is same as the second communication network.

29. The system of claim 27, wherein the first communication network is different from the second communication network.

* * * * *